(12) United States Patent
Benoit et al.

(10) Patent No.: US 7,272,285 B2
(45) Date of Patent: *Sep. 18, 2007

(54) FIBER WAVEGUIDES AND METHODS OF MAKING THE SAME

(75) Inventors: Gilles Benoit, Cambridge, MA (US); Yoel Fink, Cambridge, MA (US); John D. Joannopoulos, Belmont, MA (US); Shandon Hart, Cambridge, MA (US); Burak Temelkuran, Boston, MA (US); Garry Maskaly, North Quincy, MA (US)

(73) Assignee: Massachusetts institute of Technology, Cambridge, MA (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/733,873

(22) Filed: Dec. 10, 2003

(65) Prior Publication Data

US 2004/0223715 A1 Nov. 11, 2004

Related U.S. Application Data

(63) Continuation-in-part of application No. 10/196,403, filed on Jul. 16, 2002.

(60) Provisional application No. 60/351,066, filed on Jan. 23, 2002, provisional application No. 60/432,059, filed on Dec. 10, 2002, provisional application No. 60/305,839, filed on Jul. 16, 2001.

(51) Int. Cl.
*G02B 6/02* (2006.01)

(52) U.S. Cl. ............ 385/123; 385/124; 385/126; 385/146

(58) Field of Classification Search ............ None
See application file for complete search history.

(56) References Cited

U.S. PATENT DOCUMENTS

| 3,659,915 | A | | 5/1972 | Maurer et al. |
| 4,076,380 | A | | 2/1978 | DiMarcello et al. |
| 4,099,835 | A | | 7/1978 | French et al. |
| 4,478,486 | A | * | 10/1984 | Fentress et al. ............ 385/135 |
| 4,688,893 | A | | 8/1987 | Laakmann |
| 4,930,863 | A | | 6/1990 | Croitoriu et al. |
| 5,497,440 | A | | 3/1996 | Croitoriu et al. |

(Continued)

FOREIGN PATENT DOCUMENTS

DE 3942556 A1 * 6/1991

(Continued)

OTHER PUBLICATIONS

Allan et al. "Photonic crystal fibers: effective-index and band-gap guidance." Photonic Crystals and Light Localization in the 21st Century. 2001: Kluwer.

(Continued)

*Primary Examiner*—Kevin S Wood
*Assistant Examiner*—Omar Rojas
(74) *Attorney, Agent, or Firm*—Fish & Richardson P.C.

(57) ABSTRACT

In general, in one aspect, the invention features an article including a high-power, low-loss fiber waveguide that includes alternating layers of different dielectric materials surrounding a core extending along a waveguide axis, the different dielectric materials including a polymer and a glass.

32 Claims, 7 Drawing Sheets

U.S. PATENT DOCUMENTS

| | | | |
|---|---|---|---|
| 5,533,161 | A * | 7/1996 | Atkeisson et al. ............ 385/99 |
| 5,729,646 | A | 3/1998 | Miyagi et al. |
| 5,815,627 | A | 9/1998 | Harrington |
| 5,935,491 | A | 8/1999 | Tripathy et al. |
| 6,130,780 | A | 10/2000 | Joannopoulos et al. |
| 6,172,810 | B1 | 1/2001 | Fleming et al. |
| 6,404,966 | B1 | 6/2002 | Kawanishi et al. |
| 6,463,200 | B2 | 10/2002 | Fink et al. |
| 6,563,981 | B2 | 5/2003 | Weisberg et al. |
| 6,603,911 | B2 | 8/2003 | Fink et al. |
| 6,606,440 | B2 | 8/2003 | Hasegawa et al. |
| 6,625,364 | B2 | 9/2003 | Johnson et al. |
| 6,728,439 | B2 | 4/2004 | Weisberg et al. |
| 6,735,369 | B2 | 5/2004 | Komachi et al. |
| 6,788,864 | B2 | 9/2004 | Ahmad et al. |
| 6,801,698 | B2 | 10/2004 | King et al. |
| 6,816,243 | B2 | 11/2004 | Shurgalin et al. |
| 6,879,386 | B2 | 4/2005 | Shurgalin et al. |
| 6,895,154 | B2 | 5/2005 | Johnson et al. |
| 6,898,359 | B2 | 5/2005 | Soljacic et al. |
| 6,903,873 | B1 | 6/2005 | Joannopoulos et al. |
| 6,985,661 | B1 | 1/2006 | Russell et al. |
| 2002/0150364 | A1 | 10/2002 | Bassett et al. |
| 2002/0164137 | A1 | 11/2002 | Johnson et al. |
| 2003/0031852 | A1 | 2/2003 | Fink et al. |
| 2003/0044158 | A1 | 3/2003 | King et al. |
| 2003/0044159 | A1 | 3/2003 | Anderson et al. |
| 2004/0013379 | A1 | 1/2004 | Johnson et al. |
| 2004/0137168 | A1 | 7/2004 | Fuflyigin |
| 2004/0141702 | A1 | 7/2004 | Fuflyigin et al. |
| 2004/0223715 | A1 | 11/2004 | Benoit et al. |
| 2005/0226579 | A1 | 10/2005 | Fink et al. |
| 2005/0259933 | A1 | 11/2005 | Temelkuran et al. |
| 2005/0259934 | A1 | 11/2005 | Temelkuran et al. |
| 2005/0259942 | A1 | 11/2005 | Temelkuran et al. |
| 2005/0259944 | A1 | 11/2005 | Anderson et al. |
| 2005/0271340 | A1 | 12/2005 | Weisberg et al. |

FOREIGN PATENT DOCUMENTS

| | | |
|---|---|---|
| EP | 0 844 501 | 5/1998 |
| GB | 1198904 | 5/1968 |
| WO | WO99/47465 | 9/1999 |
| WO | WO 00/22466 | 4/2000 |
| WO | WO 00/43815 | 7/2000 |
| WO | WO 00/46287 | 8/2000 |
| WO | WO 02/41050 | 5/2002 |
| WO | WO 02/061467 | 8/2002 |
| WO | WO 02/072489 | 9/2002 |
| WO | WO 03/079073 | 9/2003 |
| WO | WO 03/079077 | 9/2003 |

OTHER PUBLICATIONS

Barkou et al. "Silica-air photonic crystal fiber design that permits waveguiding by a true photonic bandgap effect." Optics Letters, 24:1, Jan. 1, 1999, pp. 46-48.

Baumeister, P. "the transmission and degree of polarization of quarter-wave stacks at non-normal incidence." Opt. Acta, 8, 1961, pp. 105-119.

Birks et al. "Full 2-D photonic bandgaps in silica/air structures." Electronic Letters, 31:22, Oct. 26, 1995, pp. 1941-1943.

Bormashenko et al. "Development of new-near-infrared filters based on the 'sandwich'polymer- chalcogenide glass-polymer composites." Optical Engineering, 40:5, 2001, pp. 661-662.

Bormashenko et al. "New Oriented Polymer/Thermoplastic Glass Composites for IR Optics." Engineering Materials, 10, 2000, pp. ?-?.

Bormashenko et al. "Optical Properties and infrared optics applications of composite films based on polyethylene and low-melting-point chalcogendie." Society of Photo-Optical Instrumentation Engineers, Feb. 2002.

Bornstein et al. "Chalcogenide Hollow Fibers." Journal of Non-Crystalline Solids, 77:8, 1985, pp. 1277-1280.

Broeng et al. "Analysis of air-guiding photonic bandgap fibers." Optics Letters, 25:2, 2000, pp. 96-98.

Cregan et al. "Single-Mode Photonic Band Gap Guidance of Light in Air." Science. 285, Sep. 3, 1999, pp. 1537-1539.

Dai et al. "High-peak-power, pulsed $CO_2$ laser light delivery by hollow glass waveguides." Appl Optics, 36, 1997, pp. 5072-5077.

De Sterke et al. "Differential losses in Bragg fibers." J. Appl. Phys., 76:2, Jul. 15, 1994, pp. 680-688.

Eggleton et al. Microstructured optical fiber devices. Optics Express, 9:13, 2001, pp. 698-713.

Feigel A. et al. "Chalcogenide glass-based three-dimensional photonic crystals." Applied Physics Letters, 77:20, pp. 3221-3223, Nov. 13, 2000.

Fink et al. "A dielectric omnidirectional reflector." Science, 282:5394, 1998, pp. 1679-1682.

Fink et al. "Guiding Optical Light in Air Using an All-Dielectric Structure." Journal of Lightwave Technology, 17:11, Nov. 11, 1999, pp. 2039-2041.

Fitt et al. "Modeling the fabrication of hollow fibers: Capillary drawings." Journal of Lightwave Technology, 19:12, 2001, pp. 1924-1931.

Gopal et al. "Deposition and characterization of metal sulfide dielctric coatings for hollow glass waveguide." Optical Society of America. 2003. Optics Express, 11:24, Dec. 1, 2003.

Harrington, J.A. "Infrared Fibers in Handbook of Optics." McGraw-Hill, 2001, pp. 14, 1-14, 13.

Harrington, James. "A Review of IR Transmitting, Hollow Waveguides." Fiber and Integrated Optics, 19, 2000, pp. 211-217.

Hart et al. "External Reflection from Omnidirectional Dielectric Mirror Fibers." Science, 296, Apr. 19, 2002, pp. 510-513.

Hilton, A.R., "Optical Properties of Chalcogenide Glasses." Journal of Non-Crystalline Solids, 2, 1970, pp. 28-39.

Hongo et al. "Transmission of Kilowatt-Class Co2-Laser Light through Dielectric-Coated Metallic Hollow Wave-Guides for Material Processing." Applied Optics, 31:24, 1992. pp. 5114-5120.

Ibanescu et al. "An all-dielectric coaxial wavegide." Science, 289:5478, 2000, pp. 415-419.

Ibanescu et al. "Analysis of Mode Structure in OmniGuide Fibers." Physical Review E, 67:4, 2003.

John, S. "Strong Localization of Photons in Certain Disorderd Dielectric Superlattices." Physical Review Letters, 58:23, 1987, pp. 2486-2486.

Johnson et al. "Low-loss asymptotically single-mode propagation in large-core OmniGuide fibers." Optics Express, 9:13, 2001, pp. 748-779.

Keck et al. "On the ultimate lower limit of attenuation in glass optical waveguides." Applied Physics Letters, 22:7, 1973, pp. 307-309.

King et al"Laboratory preparation of highly pure $As_2Se_3$ glass." J. Non-Cryst. Sol., 181, 1995, pp. 231-237.

Knight et al. "Photonic Band Gap Guidance in Optical Fibers." Science, 282, Nov. 20, 1998, pp. 1476-1478.

Kucuk et al. "An estimation of the surface tension for silicate glass melts at 1400° C. using statistical analysis." Glass Technol., 40, 1999, pp. 149-153.

Mahlein. Generalized Brewster-angle conditions for quarter-wave multilayers at non-normal incidence. J. Opt. Soc. Am., 64, 1974, pp. 647-352.

Marcatilli et al. "Hollow metallic and dielectric waveguides for long distance optical transmission and lasers." Bell Syst. Tech. J., 43, 1964, pp. 1783-1809.

Mossadegh R. et al. "Fabrication of single-mode chalcogenide optial fiber." Journal of Lightwave Technology, 16:2, pp. 214-216, Feb. 1998.

Matsuura et al. "Hollow infrared fibers fabricated by glass-drawing technique." Optics Express, 10:12, 2002. pp. 488-492.

Matsuura et al. "Small-bore hollow waveguide for delivery of near singlemode IR laster radiation." Electronic Letters, 30, 1994, pp. 1688-1690.

Maurer et al. "Fused silica optical waveguide." Corning Glass Works, 1972.

Mitra et al. "Nonlinear limits to the information capacity of optical fibre communications." Nature, 411, 2001, pp. 1027-1030.

Miyagi et al. "Design Theory of Dielectric-Coated Circular Metallic Waveguides for Infrared Transmission." Journal of Lightwave Technology, 2:2, 1984, pp. 116-126.

Monro, T.M. et al. "Chalcogenide Holey Fibres." Electronics Letters, 36:24, pp. 1998-2000, Nov. 23, 2000.

Nishii, J. et al. "Chalcogenide glass fiber with a core-cladding structure." Applied Optics, 28: 23, pp. 5122-5127, Dec. 1, 1989.

Nubling et al. "Hollow-waveguide delivery systems for high-power, industrial $CO_2$ lasers." Applied Optics, 34:3, Jan. 20, 1996, pp. 372-380.

Ouyang et al. "Comparitive study of air-core and coaxial Bragg fibers: single-mode transmission and dispersion characteristics." Optics Express, 9:13, 2001, pp. 733-747.

Pottage et al. "Robust photonic band gaps for hollow core guidance in PCF made from high index glass." Optics Express, 11:22, Nov. 3, 2003, pp. 2854-2861.

Renn et al. "Laser-Guided Atoms in Hollow-Core Optical Fibers." Physical Review Letters, 75:18, 1995, pp. 3253-3256.

Rundquist et al. "Phase-matched generation of coherent soft-X-rays." Science, 280:5368, 1998, pp. 1412-1415.

Sanghera et al. "Active and passive chalcogenide glass optical fibers for IR applications: a review." Journal of Non-Crystalline Solids, 257, 1999, pp. 6-16.

Sanghera, J.S. et al. "Development and infrared applications of chalcogenide class optial fibers." Fiber and Integrated Optics, 19:3, pp. 251-274, Mar. 1, 2000.

Sanghera, J.S. et al. "Fabrication of long lengths of low-loss IR transmitting AS40S (60-X) sex glass fibers." Journal of Lightwave Technology, 14:5, pp. 743-748, May 1, 1996.

Seddon, A.B. "Chalcogenide glasses: a review of their preparation, properties and applications." J. Non-Cyrst. Sol., 184, 1995, pp. 44-50.

Temelkuran et al. "Wavelength-scalable hollow optical fibres with large photonic bandgaps for $CO_2$ laser transmission." Nature, 420, Dec. 12, 2002, pp. 650-653.

Temelkuran et al. "Low-loss infrared dielectric materials system for broadband dual-rang omnidirectional reflectivity." Optics Letters, 26, 2001, pp. 1370-1372.

Varsheneya A.K. Fundamentals of Inorganic Glasses, Academic Press, San Diego, pp. 5-7,1994.

Varshneya, A. K. "Some comments on physical properties of chalcogenide glasses." J. Non-Cryst. Sol., 273, 2000, pp. 1-7.

Vienne et al. "First demonstration of air-silica Bragg fiber." Optical Society of America, 2003. Institute of Electrical and Electronics Engineers. Optical Fiber Communication Conference and Exposition Postdeadline Papers.

Weber et al. Giant Birefringent Optics in Multilayer Polymer Mirrors. Science, 287, 2000, pp. 2451-2457.

Winn et al. Omnidirectional reflection from a one-dimensional photonic crystal. Optics Letters, 23, 1998, pp. 1573-1575.

Yablonovitch. E. "Inhibited Spontaneous Emission in Solid-State Physics and Electronics." Physical Review Letters, 58:20, 1987, pp. 2059-2062.

Yeh et al. "Theory of Bragg Fiber." Journal of the Optical Society of America, 68:9, 1978, pp. 1196-1201.

Yeh et al. Electromagnetic propagation in periodic stratified media. I. General theory. J. Opt. Soc. Am., 687, 1977, pp. 423-438.

European Search Report for Application No. / Patent No. 03796927.6 / PCT/US0339344, dated May 12, 2006.

* cited by examiner

FIBER WAVEGUIDES AND METHODS OF MAKING THE SAME

CROSS-REFERENCE TO RELATED APPLICATIONS

This application is a continuation-in-part of U.S. application Ser. No. 10/196,403, filed on Jul. 16, 2002, which claims priority to Provisional Patent Application No. 60/305,839, filed on Jul. 16, 2001, and to Provisional Patent Application 60/351,066, filed on Jan. 23, 2002. This application claims priority to Provisional Patent Application 60/432,059, filed on Dec. 10, 2002. The contents of each of the abovementioned applications are hereby incorporated by reference in their entirety.

STATEMENT OF GOVERNMENT RIGHTS

This invention was made with government support under Grant Number ECS-0123460 awarded by NSF, and Grant Number DAAD19-01-1-0647, awarded by the Army. The government has certain rights in the invention.

BACKGROUND

This invention relates to the field of fiber waveguides and methods for making waveguides.

Waveguides play important roles in numerous industries. For example, optical waveguides are widely used in telecommunications networks, where fiber waveguides such as optical fibers are used to carry information between different locations as optical signals. Such waveguides substantially confine the optical signals to propagation along a preferred path or paths. Other applications of optical waveguides include imaging applications, such as in an endoscope, and in optical detection.

The most prevalent type of fiber waveguide is an optical fiber, which utilizes index guiding to confine an optical signal to a preferred path. Such fibers include a core region extending along a waveguide axis and a cladding region surrounding the core about the waveguide axis and having a refractive index less than that of the core region. Because of the index-contrast, optical rays propagating substantially along the waveguide axis in the higher-index core can undergo total internal reflection (TIR) from the core-cladding interface. As a result, the optical fiber guides one or more modes of electromagnetic (EM) radiation to propagate in the core along the waveguide axis. The number of such guided modes increases with core diameter. Notably, the index-guiding mechanism precludes the presence of any cladding modes lying below the lowest-frequency guided mode for a given wavevector parallel to the waveguide axis. Almost all index-guided optical fibers in use commercially are silica-based in which one or both of the core and cladding are doped with impurities to produce the index contrast and generate the core-cladding interface. For example, commonly used silica optical fibers have indices of about 1.45 and index contrasts ranging from about 0.2% to 3% for wavelengths in the range of 1.5 microns, depending on the application.

Drawing a fiber from a preform is the most commonly used method for making fiber waveguides. A preform is a short rod (e.g., 10 to 20 inches long) having the precise form and composition of the desired fiber. The diameter of the preform, however, is much larger than the fiber diameter (e.g., 100's to 1000's of times larger). Typically, when drawing an optical fiber, the material composition of a preform includes a single glass having varying levels of one or more dopants provided in the preform core to increase the core's refractive index relative to the cladding refractive index. This ensures that the material forming the core and cladding are rheologically and chemically similar to be drawn, while still providing sufficient index contrast to support guided modes in the core. To form the fiber from the preform a furnace heats the preform to a temperature at which the glass viscosity is sufficiently low (e.g., less than 108 Poise) to draw fiber from the preform. Upon drawing, the preform necks down to a fiber that has the same cross-sectional composition and structure as the preform. The diameter of the fiber is determined by the specific rheological properties of the fiber and the rate at which it is drawn.

Preforms can be made using many techniques known to those skilled in the art, including modified chemical vapor deposition (MCVD), outside vapor deposition (OVD), plasma activated chemical vapor deposition (PCVD) and vapor axial deposition (VAD). Each process typically involves depositing layers of vaporized raw materials onto a wall of a pre-made tube or rod in the form of soot. Each soot layer is fused shortly after deposition. This results in a preform tube that is subsequently collapsed into a solid rod, over jacketed, and then drawn into fiber.

Optical fibers applications can be limited by wavelength and signal power. Preferably, fibers should be formed from materials that have low absorption of energy at guided wavelengths and should have minimal defects. Where absorption is high, it can reduce signal strength to levels indistinguishable from noise for transmission over long fibers. Even for relatively low absorption materials, absorption by the core and/or cladding heats the fiber. Defects can scatter guided radiation out of the core, which can also lead to heating of the fiber. Above a certain power density, this heating can irreparably damage the fiber. Accordingly, many applications that utilize high power radiation sources use apparatus other than optical fibers to guide the radiation from the source to its destination.

SUMMARY

In certain aspects, the invention features photonic crystal waveguides (e.g., Bragg fibers) that include polymer portions and glass portions (e.g., chalcogenide glass portions). In some embodiments, the photonic crystal waveguides include a hollow core. Confinement of radiation in the hollow core is provided by photonic bandgaps established by multiple alternating layers of polymer and glass (e.g., a continuous polymer layer and a continuous glass layer wound into a spiral). Typically, the glass layers have a high refractive index and the polymer layers have a low refractive index. Fundamental and high-order spectral transmission windows are determined by optical thickness of the alternating layers and can be scaled from visible radiation (e.g., having wavelengths 0.35 to 0.75 microns) to infrared radiation (e.g., having wavelengths 0.75 to about 15 microns or more).

The invention also features methods for making fiber photonic crystal fiber waveguides. A polymer substrate is coated with a layer of glass to form a planar multilayer film. The multilayer film is then rolled to provide a hollow multilayer tube with a spiral cross section. The hollow tube is subsequently consolidated by heating to fuse the spiral layers and provide a hollow fiber preform, which is drawn into the fiber waveguide.

Materials can be selected to provide high index contrast between different portions of the photonic crystal waveguides. High index contrast can provide fibers with large photonic bandgaps and omnidirectional reflectivity. The large photonic bandgaps can result in short penetration depths within portions of the waveguide surrounding the core, reducing radiation and absorption losses of radiation guided by the fiber.

Co-drawing optically dissimilar materials can provide fibers with low defect densities when the thermo-mechanical, rheological, and physico-chemical properties of the fiber materials are compatible. Accordingly, in certain aspects, the invention features combinations of glasses and polymers which can be co-drawn and criteria for selecting glasses and polymers that can be co-drawn.

Low loss, low defect density fibers can be used to guide high power radiation with little or no damage to the fiber.

In general, in a first aspect, the invention features a method including rolling a multilayer structure into a spiral structure, and forming a fiber waveguide, wherein the forming includes drawing a fiber preform derived from the spiral structure.

Embodiments of the methods can include one or more of the following features and/or feature of other aspects.

The multilayer structure can include at least two layers comprising materials with different refractive indices. The layers can include a layer of a first material and a pair of layers of a second material sandwiching the first material layer. The layers can be substantially planar. The different materials can include a first material that includes a glass and a second material that includes a polymer. In some embodiments, the different materials include a high-index material and a low-index material, and wherein a ratio of the refractive index of the high-index material to that of the low-index material is greater than 1.5 (e.g., greater than 1.8).

The method can further include disposing at least a first layer of a first material (e.g., a glass, such as a chalcogenide glass) on a second layer of a second material (e.g., a polymer, such as PES or PEI) different from that of the first material to form the multilayer structure. The first material can be disposed on both sides of the second layer. The disposing can include sputtering or evaporating. Additional layers can be disposed on the first and second layers to form the multilayer article.

The multilayer structure can be rolled around a rod (e.g., a hollow rod) to form the spiral structure. The method can include consolidating the spiral structure to form the preform. Consolidating can include heating the spiral structure. In some embodiments, consolidating includes heating the spiral structure under vacuum. The method can include removing the rod (e.g., by chemical etching) from the preform prior to the drawing.

The spiral structure can include a core surrounded by alternating layers of the multilayer structure. The fiber waveguide can include a hollow core surrounded by multiple layers corresponding to the multilayer structure.

In general, in another aspect, the invention features an article including a fiber waveguide that includes alternating layers of different materials surrounding a core extending along a waveguide axis, wherein the alternating layers define a spiral structure.

Embodiments of the article can include one or more of the following features and/or features of other aspects.

The spiral structure can include a multilayer structure including at least two layers of the different materials encircling the core multiple times. The different materials can include a high-index dielectric material and a low-index dielectric material, and wherein a ratio of the refractive index of the high-index material to that of the low-index material is greater than 1.5 (e.g., greater than 1.8). The different materials can include a polymer (e.g., PES) and a chalcogenide glass (e.g., $As_2Se_3$).

The inner most layer of the alternating layers can have a thickness smaller than that of subsequent layers of the same material. Thicknesses of the alternating layers can be selected to guide EM radiation along the waveguide axis in at a wavelength in the range of about 8-12 microns (e.g., at a wavelength of about 10.6 microns). In some embodiments, thicknesses of the alternating layers are selected to guide EM radiation along the waveguide axis at a wavelength in the range of about 2-5 microns.

The core can be hollow. The fiber waveguide can exhibit transmission losses smaller than about 1 dB/m at a selected wavelength for a straight length of the fiber (e.g., for a wavelength in a range of about 0.75 to about 10.6 microns). In some embodiments, the selected wavelength is about 10.6 microns.

The fiber waveguide can exhibit transmission losses smaller than about 1.5 dB at a selected wavelength when bent around a 90 degree turn with any bending radius within a range of about 4-10 cm (e.g., for a wavelength in a range of about 0.75 to about 10.6 microns).

The fiber waveguide can be capable of guiding EM radiation along the waveguide axis at power densities greater than or equal to about 300 W/cm$^2$ for a selected wavelength (e.g., for a wavelength in a range of about 0.75 to about 10.6 microns). In some embodiments, the selected wavelength is about 10.6 microns. The fiber waveguide can be capable of guiding the EM radiation along the waveguide axis at power densities greater than or equal to about 300 W/cm$^2$ for the selected wavelength even when the fiber waveguide is smoothly bent around a 90 degree turn with a bent length of at least 0.3 m.

The fiber waveguide can be capable of guiding the EM radiation along the waveguide axis at powers greater than or equal to about 25 W for a selected wavelength (e.g., for a wavelength in a range of about 0.75 to about 10.6 microns). In some embodiments, the selected wavelength is about 10.6 microns.

In general, in a further aspect, the invention features an article including a high-power, low-loss fiber waveguide that includes alternating layers of different dielectric materials surrounding a core extending along a waveguide axis, the different dielectric materials including a polymer and a glass.

Embodiments of the article can include one or more of the following features and/or features of other aspects.

The alternating layers can define a spiral structure. The spiral structure can include a multilayer structure comprising at least two layers of the different materials encircling the core multiple times. The different materials can include a high-index dielectric material and a low-index dielectric material, and wherein a ratio of the refractive index of the high-index material to that of the low-index material is greater than 1.5. The different materials can include a high-index dielectric material and a low-index dielectric material, and wherein a ratio of the refractive index of the high-index material to that of the low-index material is greater than 1.8. The glass can include a chalcogenide glass (e.g., $As_2Se_3$). The polymer can include PES or PEI. The inner most layer of the alternating layers can have a thickness smaller than that of subsequent layers of the same material. Thicknesses of the alternating layers can be selected to guide EM radiation along the waveguide axis at a wavelength in the range of about 8-12 microns (e.g., at a wavelength of about 10.6 microns). In some embodiments, thicknesses of the alternating layers are selected to guide EM radiation along the waveguide axis at a wavelength in the range of about 2-5 microns.

The core can be hollow.

The fiber waveguide can exhibit transmission losses smaller than about 1 dB/m at a selected wavelength for a straight length of the fiber waveguide (e.g., for a wavelength in a range of about 0.75 to about 10.6 microns). The selected wavelength can be about 10.6 microns.

The fiber waveguide can exhibit transmission losses smaller than about 1.5 dB at the selected wavelength when bent around a 90 degree turn with any bending radius within a range of about 4-10 cm (e.g., for a wavelength in a range of about 0.75 to about 10.6 microns). The selected wavelength can be about 10.6 microns.

The fiber waveguide can be capable of guiding EM radiation along the waveguide axis at power densities greater than or equal to about 300 W/cm$^2$ for a selected wavelength (e.g., for a wavelength in a range of about 0.75 to about 10.6 microns). The selected wavelength can be about 10.6 microns.

The fiber waveguide can be capable of guiding the EM radiation along the waveguide axis at power densities greater than or equal to about 300 W/cm$^2$ for the selected wavelength even when the fiber waveguide is smoothly bent around a 90 degree turn with a bent length of at least 0.3 m.

The fiber waveguide can be capable of guiding the EM radiation along the waveguide axis at powers greater than or equal to about 25 W for a selected wavelength (e.g., for a wavelength in a range of about 0.75 to about 10.6 microns). The selected wavelength can be about 10.6 microns.

Embodiments of the invention may have one or more of the following advantages.

Photonic crystal fiber waveguides can have low transmission loss, for both straight and bent lengths of fiber. They may be used to guide high power EM radiation. They can be used to guide EM radiation with high power densities. They may be used to guide EM radiation at IR wavelengths (e.g., 0.75 to about 12 microns or more).

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
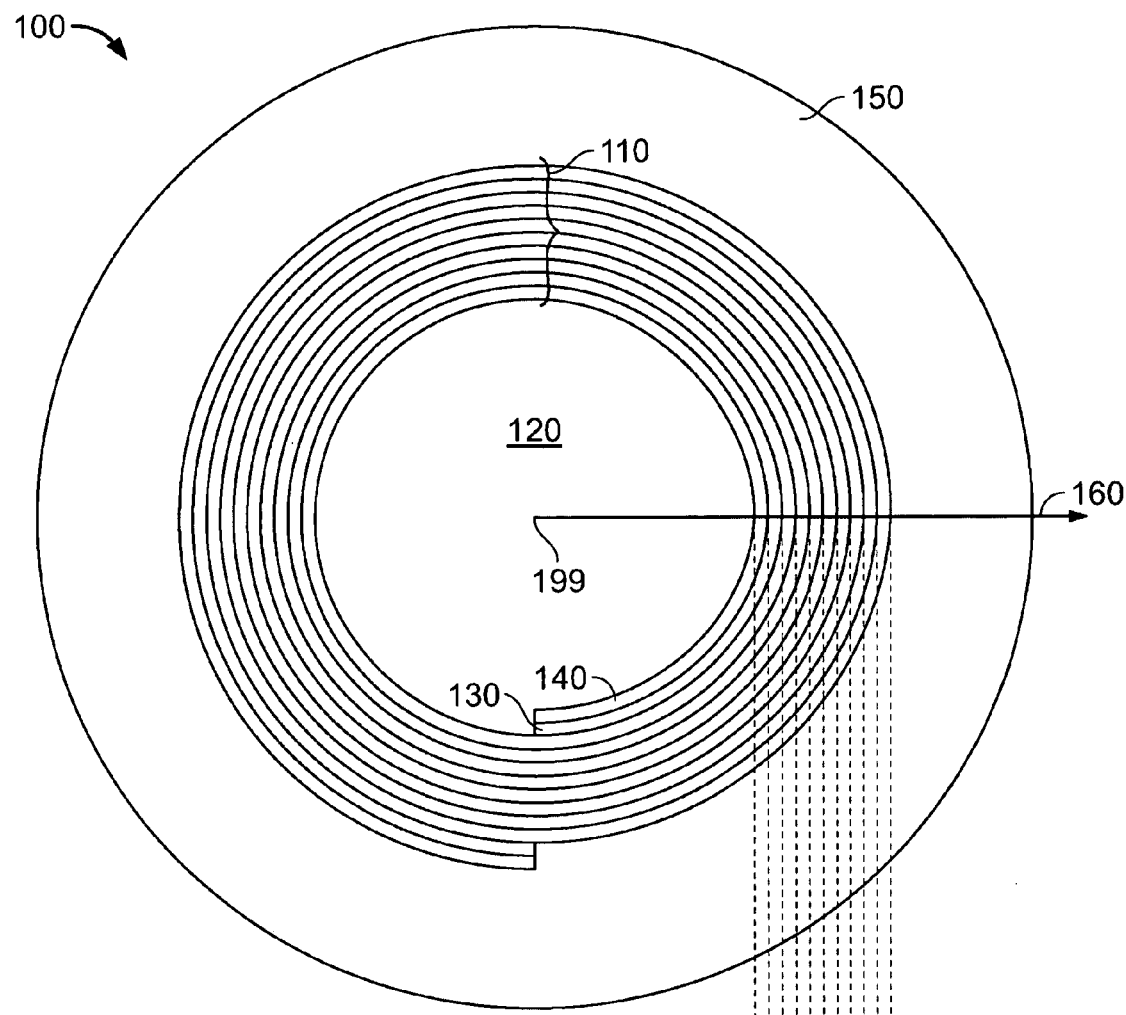
FIG. 1A is a cross-sectional view of an embodiment of a photonic crystal fiber waveguide.

Referring to FIG. 1A, a photonic crystal fiber waveguide 100 includes a core 120 extending along a waveguide axis and a dielectric confinement region 110 (e.g., alternating high index and low index layers) surrounding the core. Confinement region 110 is surrounded by a support layer 150, which provides mechanical support for the confinement region.

Confinement region 110 includes continuous layers 130 and 140 of dielectric material (e.g., polymer, glass) having different refractive indices, as opposed to multiple discrete, concentric layers that form confinement regions in other embodiments. Continuous layers 130 and 140 form a spiral around a longitudinal axis 199 along which the photonic crystal fiber waveguide guides electromagnetic radiation. One of the layers, e.g., layer 140, is a high-index layer having an index $n_H$ and a thickness $d_H$, and the layer, e.g., layer 130, is a low-index layer having an index $n_L$ and a thickness $d_L$, where $n_H > n_L$ (e.g., $n_H - n_L$ can be greater than or equal to or greater than 0.01, 0.05, 0.1, 0.2, 0.5 or more). Because layers 130 and 140 spiral around axis 199, a radial section 160 extending from axis 199 intersects each of the layers more than once, providing a radial profile that includes alternating high index and low index layers.

Figure 1B:
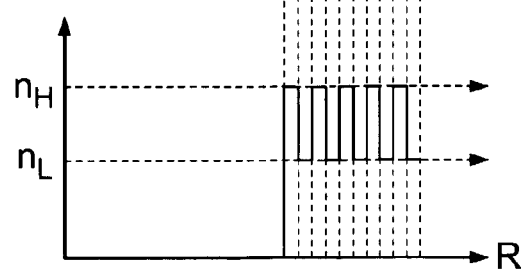
FIG. 1B is a plot of the refractive index profile of a part of the photonic crystal fiber waveguide shown in FIG. 1A.

Referring to FIG. 1B, optically, the spiraled layers provide a periodic variation in the index of refraction along radial section 160, with a period corresponding to the optical thickness of layer 130 and layer 140, i.e., confinement region 110 has an bilayer optical period $n_H d_H + n_L d_L$. "R" refers to the radial position as measured from axis 199.

The thickness ($d_H$ and $d_L$) and optical thickness ($n_H d_H$ and $n_L d_L$) of layers 130 and 140 can vary. In some embodiments, the optical thickness of layer 130 and layer 140 are the same. Layer thickness is usually selected based on the desired optical performance of the fiber (e.g., according to the wavelength radiation to be guided). The relationship between layer thickness and optical performance is discussed below. Typically, layer thickness is in the sub-micron to tens of micron range. For example, layers 130 and 140 can be between about 0.1 μm to 20 μm thick (e.g., about 0.5 to 5 μm thick).

For the embodiment shown in FIG. 1A, confinement region 110 is 5 bilayers thick. In practice, however, confinement region 110 may include many more bilayers (e.g., more than about 8 bilayers, 10 bilayers, 15 bilayers, 20 bilayers, 25 bilayers, such as 40 or more bilayers).

Layer 140 includes a material that has a high refractive index, such as a chalcogenide glass. Layer 130 includes a material having a refractive index lower than the high index material of layer 140, and is typically mechanically flexible.

For example, layer 130 often includes a polymer. Preferably, the materials forming layer 130 and layer 140 can be co-drawn. Criteria for selecting materials that can be co-drawn are discussed below.

In the present embodiment, core 120 is hollow. Optionally, the hollow core can be filled with a fluid, such as a gas (e.g., air, nitrogen, and/or a noble gas) or liquid (e.g., an isotropic liquid or a liquid crystal). Alternatively, core 120 can include any material or combination of materials that are Theologically compatible with the materials forming confinement region 110. In certain embodiments, core 120 can include one or more dopant materials, such as those described in U.S. patent application Ser. No. 10/121,452, entitled "HIGH INDEX-CONTRAST FIBER WAVEGUIDES AND APPLICATIONS," filed Apr. 12, 2002 and now published under Pub. No. U.S. -2003-0044158-A1, the entire contents of which are hereby incorporated by reference.

Core and confinement regions 120 and 110 may include multiple dielectric materials having different refractive indices. In such cases, we may refer to an "average refractive index" of a given region, which refers to the sum of the weighted indices for the constituents of the region, where each index is weighted by the fractional area in the region of its constituent. The boundary between layers 130 and 140, however, is defined by a change in index. The change may be caused by the interface of two different dielectric materials or by different dopant concentrations in the same dielectric material (e.g., different dopant concentrations in silica).

Dielectric confinement region 110 guides EM radiation in a first range of wavelengths to propagate in dielectric core 120 along waveguide axis 199. The confinement mechanism is based on a photonic crystal structure in region 110 that forms a bandgap including the first range of wavelengths. Because the confinement mechanism is not index-guiding, it is not necessary for the core to have a higher index than that of the portion of the confinement region immediately adjacent the core. To the contrary, core 120 may have a lower average index than that of confinement region 110. For example, core 120 may be air, some other gas, such as nitrogen, or substantially evacuated. In such a case, EM radiation guided in the core will have much smaller losses and much smaller nonlinear interactions than EM radiation guided in a silica core, reflecting the smaller absorption and nonlinear interaction constants of many gases relative to silica or other such solid material. In additional embodiments, for example, core 120 may include a porous dielectric material to provide some structural support for the surrounding confinement region while still defining a core that is largely air. Accordingly, core 120 need not have a uniform index profile.

Layers 130 and 140 of confinement region 110 form what is known as a Bragg fiber. The periodic optical structure of the spirally wound layers are analogous to the alternating layers of a planar dielectric stack reflector (which is also known as a Bragg mirror). The layers of confinement region 110 and the alternating planar layers of a dielectric stack reflector are both examples of a photonic crystal structure. Photonic crystal structures are described generally in *Photonic Crystals* by John D. Joannopoulos et al. (Princeton University Press, Princeton N.J., 1995).

As used herein, a photonic crystal is a dielectric structure with a refractive index modulation that produces a photonic bandgap in the photonic crystal. A photonic bandgap, as used herein, is a range of wavelengths (or inversely, frequencies) in which there are no accessible extended (i.e., propagating, non-localized) states in the dielectric structure. Typically the structure is a periodic dielectric structure, but it may also include, e.g., more complex "quasi-crystals." The bandgap can be used to confine, guide, and/or localize light by combining the photonic crystal with "defect" regions that deviate from the bandgap structure. Moreover, there are accessible extended states for wavelengths both below and above the gap, allowing light to be confined even in lower-index regions (in contrast to index-guided TIR structures, such as those described above). The term "accessible" states means those states with which coupling is not already forbidden by some symmetry or conservation law of the system. For example, in two-dimensional systems, polarization is conserved, so only states of a similar polarization need to be excluded from the bandgap. In a waveguide with uniform cross-section (such as a typical fiber), the wavevector β is conserved, so only states with a given β need to be excluded from the bandgap to support photonic crystal guided modes. Moreover, in a waveguide with cylindrical symmetry, the "angular momentum" index m is conserved, so only modes with the same m need to be excluded from the bandgap. In short, for high-symmetry systems the requirements for photonic bandgaps are considerably relaxed compared to "complete" bandgaps in which all states, regardless of symmetry, are excluded.

Accordingly, the dielectric stack reflector is highly reflective in the photonic bandgap because EM radiation cannot propagate through the stack. Similarly, the layers in confinement region 110 provide confinement because they are highly reflective for incident rays in the bandgap. Strictly speaking, a photonic crystal is only completely reflective in the bandgap when the index modulation in the photonic crystal has an infinite extent. Otherwise, incident radiation can "tunnel" through the photonic crystal via an evanescent mode that couples propagating modes on either side of the photonic crystal. In practice, however, the rate of such tunneling decreases exponentially with photonic crystal thickness (e.g., the number of alternating layers). It also decreases with the magnitude of the index-contrast in the confinement region.

Furthermore, a photonic bandgap may extend over only a relatively small region of propagation vectors. For example, a dielectric stack may be highly reflective for a normally incident ray and yet only partially reflective for an obliquely incident ray. A "complete photonic bandgap" is a bandgap that extends over all possible wavevectors and all polarizations. Generally, a complete photonic bandgap is only associated with a photonic crystal having index modulations along three dimensions. However, in the context of EM radiation incident on a photonic crystal from an adjacent dielectric material, we can also define an "omnidirectional photonic bandgap," which is a photonic bandgap for all possible wavevectors and polarizations for which the adjacent dielectric material supports propagating EM modes. Equivalently, an omnidirectional photonic bandgap can be defined as a photonic band gap for all EM modes above the light line, wherein the light line defines the lowest frequency propagating mode supported by the material adjacent the photonic crystal. For example, in air the light line is approximately given by $\omega = c\beta$, where $\omega$ is the angular frequency of the radiation, $\beta$ is the wavevector, and c is the speed of light. A description of an omnidirectional planar reflector is disclosed in U.S. Pat. No. 6,130,780, the contents of which are incorporated herein by reference. Furthermore, the use of alternating dielectric layers to provide omnidirectional reflection (in a planar limit) for a cylindrical waveguide geometry is disclosed in U.S. Pat. No. 6,463,200, entitled "OMNIDIRECTIONAL MULTILAYER DEVICE FOR ENHANCED OPTICAL WAVEGUIDING," to Yoel Fink et al., the contents of which are incorporated herein by reference.

When alternating layers 130 and 140 in confinement region 110 give rise to an omnidirectional bandgap with respect to core 120, the guided modes are strongly confined because, in principle, any EM radiation incident on the confinement region from the core is completely reflected. However, such complete reflection only occurs when there are an infinite number of layers. For a finite number of layers (e.g., about 10 bilayers), an omnidirectional photonic bandgap may correspond to a reflection in a planar geometry of at least 95% for all angles of incidence ranging from 0° to 80° and for all polarizations of EM radiation having frequency in the omnidirectional bandgap. Furthermore, even when photonic crystal fiber waveguide 100 has a confinement region with a bandgap that is not omnidirectional, it may still support a strongly guided mode, e.g., a mode with radiation losses of less than 0.1 dB/km for a range of frequencies in the bandgap. Generally, whether or not the bandgap is omnidirectional will depend on the size of the bandgap produced by the alternating layer (which generally scales with index-contrast of the two layers) and the lowest-index constituent of the photonic crystal.

In a Bragg-like configuration, the high-index layers may vary in index and thickness, and/or the low-index layers may vary in index and thickness. The confinement region may also include a periodic structure including more than two layers per period (e.g., three or more layers per period). Moreover, the refractive index modulation may vary continuously or discontinuously as a function of fiber radius within the confinement region. In general, the confinement region may be based on any index modulation that creates a photonic bandgap.

In the present embodiment, multilayer structure 110 forms a Bragg reflector because it has a periodic index variation with respect to the radial axis. A suitable index variation is an approximate quarter-wave condition. It is well-known that, for normal incidence, a maximum band gap is obtained for a "quarter-wave" stack in which each layer has equal optical thickness $\lambda/4$, or equivalently $d_H/d_L = n_L/n_H$, where d and n refer to the thickness and index, respectively, of the high-index and low-index layers. These correspond to layers 240 and 230, respectively. Normal incidence corresponds to $\beta=0$. For a cylindrical waveguide, the desired modes typically lie near the light line $\omega=c\beta$ (in the large core radius limit, the lowest-order modes are essentially plane waves propagating along z-axis, i.e., the waveguide axis). In this case, the quarter-wave condition becomes:

$$\frac{d_H}{d_L} = \frac{\sqrt{n_L^2 - 1}}{\sqrt{n_H^2 - 1}}$$

Strictly speaking, this equation may not be exactly optimal because the quarter-wave condition is modified by the cylindrical geometry, which may require the optical thickness of each layer to vary smoothly with its radial coordinate. Nonetheless, we find that this equation provides an excellent guideline for optimizing many desirable properties, especially for core radii larger than the mid-bandgap wavelength.

Some embodiments of photonic crystal fiber waveguides are described in U.S. patent application Ser. No. 10/057,258, entitled "LOW-LOSS PHOTONIC CRYSTAL FIBER HAVING LARGE CORE RADIUS," to Steven G. Johnson et al., filed Jan. 25, 2002 and published under Pub. No. US-2002-0164137-A1, the entire contents of which are hereby incorporated by reference.

The radius of core 120 can vary depending on the end-use application of fiber 120. The core radius can depend on the wavelength or wavelength range of the energy to be guided by the fiber, and on whether the fiber is a single or multi-mode fiber. For example, where the fiber is a single mode fiber for guiding visible wavelengths (e.g., between about 400 nm and 800 nm) the core radius can be in the sub-micron to several micron range (e.g., from about 0.5 µm to 5 µm). However, where the fiber is a multimode fiber for guiding IR wavelengths (e.g., from about 2 µm to 15 µm, such as 10.6 µm), the core radius can be in the tens to thousands of microns range (e.g., from about 10 µm to 2,000 µm, such as 500 µm to 1,000 µm). The core radius can be greater than about $5\lambda$ (e.g., more than about $10\lambda$, $20\lambda$, $30\lambda$, $50\lambda$, $100\lambda$), where $\lambda$ is the wavelength of the guided energy.

As discussed previously, support layer 150 provides mechanical support for confinement region 110. The thickness of support layer 150 can vary as desired. In some embodiments, support layer 150 is substantially thicker than confinement region 110. For example, support layer 150 can be about 10 or more times thicker than confinement region 110 (e.g., more than 20, 30, 50 times thicker).

The composition of support layer 150 is usually selected to provide the desired mechanical support and protection for confinement region 110. In many embodiments, support layer 150 is formed from materials that can be co-drawn with the confinement region 110. Criteria for selecting materials suitable for co-drawing are discussed below. In some embodiments, support layer can be formed from the same material(s) as used to form confinement region 110. For example, where layer 130 is formed from a polymer, support layer 150 can be formed from the same polymer.

Turning now to the composition of layers 130 and 140 in confinement region 110, materials with a suitably high index of refraction to form a high index portion (e.g., layer 140) include chalcogenide glasses (e.g., glasses containing a chalcogen element, such as sulphur, selenium, and/or tellurium), heavy metal oxide glasses, amorphous alloys, and combinations thereof.

In addition to a chalcogen element, chalcogenide glasses may include one or more of the following elements: boron, aluminum, silicon, phosphorus, sulfur, gallium, germanium, arsenic, indium, tin, antimony, thallium, lead, bismuth, cadmium, lanthanum and the halides (fluorine, chlorine, bromide, iodine).

Chalcogenide glasses can be binary or ternary glasses, e.g., As—S, As—Se, Ge—S, Ge—Se, As—Te, Sb—Se, As—S—Se, S—Se—Te, As—Se—Te, As—S—Te, Ge—S—Te, Ge—Se—Te, Ge—S—Se, As—Ge—Se, As—Ge—Te, As—Se—Pb, As—S—Ti, As—Se—Tl, As—Te—Tl, As—Se—Ga, Ga—La—S, Ge—Sb—Se or complex, multi-component glasses based on these elements such as As—Ga—Ge—S, Pb—Ga—Ge—S, etc. The ratio of each element in a chalcogenide glass can be varied. For example, a chalcogenide glass with a suitably high refractive index may be formed with 5-30 mole % Arsenic, 20-40 mole % Germanium, and 30-60 mole % Selenium.

Examples of heavy metal oxide glasses with high refractive indices include $Bi_2O_3$—, PbO—, $Tl_2O_3$—, $Ta_2O_3$—, $TiO_2$—, and $TeO_2$— containing glasses.

Amorphous alloys with suitably high indices of refraction include Al—Te, R—Te(Se) (R=alkali).

Materials with suitably low index of refraction to form a low-index portion (e.g., layer 130) include oxide glasses, halide glasses, polymers, and combinations thereof. Polymers including those in the carbonate—(e.g., polycarbonate (PC)), sulfone—(e.g., poly(ether sulphone) (PES)), ether-imid—(e.g., poly(ether imide) (PEI)), and acrylate—(e.g., poly(methyl methacrylate) (PMMA)) families as well as fluoropolymers are good matching candidates too.

Suitable oxide glasses may include glasses that contain one or more of the following compounds: 0-40 mole % of $M_2O$ where M is Li, Na, K, Rb, or Cs; 0-40 mole % of M'O where M' is Mg, Ca, Sr, Ba, Zn, or Pb; 0-40 mole % of $M''_2O_3$ where M" is B, Al, Ga, In, Sn, or Bi; 0-60 mole % $P_2O_5$; and 0-40 mole % $SiO_2$.

Portions of photonic crystal fiber waveguides can optionally include other materials. For example, any portion can include one or more materials that change the index of refraction of the portion. A portion can include a material that increases the refractive index of the portion. Such materials include, for example, germanium oxide, which can increase the refractive index of a portion containing a borosilicate glass. Alternatively, a portion can include a material that decreases the refractive index of the portion. For example, boron oxide can decrease the refractive index of a portion containing a borosilicate glass.

Portions of high index-contrast fiber waveguides can be homogeneous or inhomogeneous. For example, one or more portions can include nano-particles (e.g., particles sufficiently small to minimally scatter light at guided wavelengths) of one material embedded in a host material to form an inhomogeneous portion. An example of this is a high-index polymer composite formed by embedding a high-index chalcogenide glass nano-particles in a polymer host. Further examples include CdSe and or PbSe nano-particles in an inorganic glass matrix.

Portions of fiber waveguides can include materials that alter the mechanical, rheological and/or thermodynamic behavior of those portions of the fiber. For example, one or more of the portions can include a plasticizer. Portions may include materials that suppress crystallization, or other undesirable phase behavior within the fiber. For example, crystallization in polymers may be suppressed by including a cross-linking agent (e.g., a photosensitive cross-linking agent). In other examples, if a glass-ceramic material was desired, a nucleating agent, such as $TiO_2$ or $ZrO_2$, can be included in the material.

Portions can also include compounds designed to affect the interface between adjacent portions in the fiber (e.g., between the low index and high index layers). Such compounds include adhesion promoters and compatibilizers. For example, an organo-silane compound can be used to promote adhesion between a silica-based glass portion and a polymer portion. For example, phosphorus or $P_2O_5$ is compatible with both chalcogenide and oxide glasses, and may promote adhesion between portions formed from these glasses.

Fiber waveguides can include additional materials specific to particular fiber waveguide applications. In fiber amplifiers, for example, any of the portions can be formed of any dopant or combination of dopants capable of interacting with an optical signal in the fiber to enhance absorption or emission of one or more wavelengths of light by the fiber, e.g., at least one rare earth ion, such as erbium ions, ytterbium ions neodymium ions, holmium ions, dysprosium ions, and/or thulium ions.

Portions of high index-contrast waveguides can include one or more nonlinear materials. Nonlinear materials are materials that enhance the nonlinear response of the waveguide. In particular, nonlinear materials have a larger nonlinear response than silica. For example, nonlinear materials have a Kerr nonlinear index, $n^{(2)}$, larger than the Kerr nonlinear index of silica (i.e., greater than $3.5\times10^{-20}$ $m^2/W$, such as greater than $5\times10^{-20}$ $m^2/W$, greater than $10\times10^{-20}$ $m^2/W$, greater than $20\times10^{-20}$ $m^2/W$, greater than $100\times10^{-20}$ $m^2/W$, greater than $200\times10^{-20}$ $m^2/W$).

When making a robust fiber waveguides using a drawing process, not every combination of materials with desired optical properties is necessarily suitable. Typically, one should select materials that are rheologically, thermo-mechanically, and physico-chemically compatible. Several criteria for selecting compatible materials will now be discussed.

A first criterion is to select materials that are Theologically compatible. In other words, one should select materials that have similar viscosities over a broad temperature range, corresponding to the temperatures experience during the different stages of fiber drawing and operation. Viscosity is the resistance of a fluid to flow under an applied shear stress. Here, viscosities are quoted in units of Poise. Before elaborating on Theological compatibility, it is usefule define a set of characteristic temperatures for a given material, which are temperatures at which the given material has a specific viscosity.

The annealing point, $T_a$, is the temperature at which a material has a viscosity $10^{13}$ Poise. $T_a$ can be measured using a Model SP-2A System from Orton Ceramic Foundation (Westerville, Ohio). Typically, $T_a$ is the temperature at which the viscosity of a piece of glass is low enough to allow for relief of residual stresses.

The softening point, $T_s$, is the temperature at which a material has a viscosity $10^{7.65}$ Poise. $T_s$ can be measured using a softening point instrument, e.g., Model SP-3A from Orton Ceramic Foundation (Westerville, Ohio). The softening point is related to the temperature at which the materials flow changes from plastic to viscous in nature.

The working point, $T_w$, is the temperature at which a material has a viscosity $10^4$ Poise. $T_w$ can be measured using a glass viscometer, e.g., Model SP-4A from Orton Ceramic Foundation (Westerville, Ohio). The working point is related to the temperature at which a glass can be easily drawn into a fiber. In some embodiments, for example, where the material is an inorganic glass, the material's working point temperature can be greater than 250° C., such as about 300° C., 400° C., 500° C. or more.

The melting point, $T_m$, is the temperature at which a material has a viscosity $10^2$ Poise. $T_m$ can also be measured using a glass viscometer, e.g., Model SP-4A from Orton Ceramic Foundation (Westerville, Ohio). The melting point is related to the temperature at which a glass becomes a liquid and control of the fiber drawing process with respect to geometrical maintenance of the fiber becomes very difficult.

To be rheologically compatible, two materials should have similar viscosities over a broad temperature range, e.g., from the temperature at which the fiber is drawn down to the temperature at which the fiber can no longer release stress at a discernible rates (e.g., at $T_a$) or lower. Accordingly, the working temperature of two compatible materials should be similar, so that the two materials flow at similar rates when drawn. For example, if one measures the viscosity of the first material, $\eta_1(T)$ at the working temperature of the second material, $T_{w2}$, $\eta_1(T_{w2})$ should be at least $10^3$ Poise, e.g., $10^4$ Poise or $10^5$ Poise, and no more than $10^6$ Poise. Moreover, as the drawn fiber cools the behavior of both materials should change from viscous to elastic at similar temperatures. In other words, the softening temperature of the two materials should be similar. For example, at the softening temperature of the second material, $T_{s2}$, the viscosity of the first material, $\eta_1(T_{s2})$ should be at least $10^6$ Poise, e.g., $10^7$ Poise or $10^8$ Poise and no more than $10^9$ Poise. In preferred embodiments, it should be possible to anneal both materials together, so at the annealing temperature of the second material, $\eta_{a2}$, the viscosity of the first material, $\eta_1(T_{a2})$ should be at least $10^8$ Poise (e.g., at least $10^9$ Poise, at least $10^{10}$ Poise, at least $10^{11}$ Poise, at least $10^{12}$ Poise, at least $10^{13}$ Poise, at least $10^{14}$ Poise).

Additionally, to be rheologically compatible, the change in viscosity as a function of temperature (i.e., the viscosity slope) for both materials should preferably match as close as possible.

A second selection criterion is that the thermal expansion coefficients (TEC) of each material should be similar at temperatures between the annealing temperatures and room temperature. In other words, as the fiber cools and its rheology changes from liquid-like to solid-like, both materials' volume should change by similar amounts. If the two materials TEC's are not sufficiently matched, a large differential volume change between two fiber portions can result in a large amount of residual stress buildup, which can cause one or more portions to crack and/or delaminate. Residual stress may also cause delayed fracture even at stresses well below the material's fracture stress.

The TEC is a measure of the fractional change in sample length with a change in temperature. This parameter can be calculated for a given material from the slope of a temperature-length (or equivalently, temperature-volume) curve. The temperature-length curve of a material can be measured using e.g., a dilatometer, such as a Model 1200D dilatometer from Orton Ceramic Foundation (Westerville, Ohio). The TEC can be measured either over a chosen temperature range or as the instantaneous change at a given temperature. This quantity has the units $°C.^{-1}$.

For many materials, there are two linear regions in the temperature-length curve that have different slopes. There is a transition region where the curve changes from the first to the second linear region. This region is associated with a glass transition, where the behavior of a glass sample transitions from that normally associated with a solid material to that normally associated with a viscous fluid. This is a continuous transition and is characterized by a gradual change in the slope of the temperature-volume curve as opposed to a discontinuous change in slope. A glass transition temperature, $T_g$, can be defined as the temperature at which the extrapolated glass solid and viscous fluid lines intersect. The glass transition temperature is a temperature associated with a change in the materials rheology from a brittle solid to a solid that can flow. Physically, the glass transition temperature is related to the thermal energy required to excite various molecular translational and rotational modes in the material. The glass transition temperature is often taken as the approximate annealing point, where the viscosity is $10^{13}$ Poise, but in fact, the measured $T_g$ is a relative value and is dependent upon the measurement technique.

A dilatometer can also be used to measure a dilatometric softening point, $T_{ds}$. A dilatometer works by exerting a small compressive load on a sample and heating the sample. When the sample temperature becomes sufficiently high, the material starts to soften and the compressive load causes a deflection in the sample, when is observed as a decrease in volume or length. This relative value is called the dilatometric softening point and usually occurs when the materials viscosity is between $10^{10}$ and $10^{12.5}$ Poise. The exact $T_{ds}$ value for a material is usually dependent upon the instrument and measurement parameters. When similar instruments and measurement parameters are used, this temperature provides a useful measure of different materials rheological compatibility in this viscosity regime.

As mentioned above, matching the TEC is an important consideration for obtaining fiber that is free from excessive residual stress, which can develop in the fiber during the draw process. Typically, when the TEC's of the two materials are not sufficiently matched, residual stress arises as elastic stress. The elastic stress component stems from the difference in volume contraction between different materials in the fiber as it cools from the glass transition temperature to room temperature (e.g., 25° C.). The volume change is determined by the TEC and the change in temperature. For embodiments in which the materials in the fiber become fused or bonded at any interface during the draw process, a difference in their respective TEC's will result in stress at the interface. One material will be in tension (positive stress) and the other in compression (negative stress), so that the total stress is zero. Moderate compressive stresses themselves are not usually a major concern for glass fibers, but tensile stresses are undesirable and may lead to failure over time. Hence, it is desirable to minimize the difference in TEC's of component materials to minimize elastic stress generation in a fiber during drawing. For example, in a composite fiber formed from two different materials, the absolute difference between the TEC's of each glass between $T_g$ and room temperature measured with a dilatometer with a heating rate of 3° C./min, should be no more than $5 \times 10^{-6} °C.^{-1}$ (e.g., no more than $4 \times 10^{-6} °C.^{-1}$, no more than $3 \times 10^{-6} °C.^{-1}$, no more than $2 \times 10^{-6} °C.^{-1}$, no more than $1 \times 10^{-6} °C.^{-1}$, no more than $5 \times 10^{-7} °C.^{-1}$, no more than $4 \times 10^{-7} °C.^{-1}$, no more than $3 \times 10^{-7} °C.^{-1}$, no more than $2 \times 10^{-7} °C.^{-1}$).

While selecting materials having similar TEC's can minimize an elastic stress component, residual stress can also develop from viscoelastic stress components. A viscoelastic stress component arises when there is sufficient difference between strain point or glass transition temperatures of the component materials. As a material cools below $T_g$ it undergoes a sizeable volume contraction. As the viscosity changes in this transition upon cooling, the time needed to relax stress increases from zero (instantaneous) to minutes. For example, consider a composite preform made of a glass and a polymer having different glass transition ranges (and different $T_g$'s). During initial drawing, the glass and polymer behave as viscous fluids and stresses due to drawing strain are relaxed instantly. After leaving the hottest part of the draw furnace, the fiber rapidly loses heat, causing the viscosities of the fiber materials to increase exponentially, along with the stress relaxation time. Upon cooling to its $T_g$, the glass and polymer cannot practically release any more stress since the stress relaxation time has become very large compared with the draw rate. So, assuming the component materials possess different $T_g$ values, the first material to cool to its $T_g$ can no longer reduce stress, while the second material is still above its $T_g$ and can release stress developed between the materials. Once the second material cools to its $T_g$, stresses that arise between the materials can no longer be effectively relaxed. Moreover, at this point the volume contraction of the second glass is much greater than the volume contraction of the first material (which is now below its $T_g$ and behaving as a brittle solid). Such a situation can result sufficient stress buildup between the glass and polymer so that one or both of the portions mechanically fail. This leads us to a third selection criterion for choosing fiber materials: it is desirable to minimize the difference in $T_g$'s of component materials to minimize viscoelastic stress generation in a fiber during drawing. Preferably, the glass transition temperature of a first material, $T_{g1}$, should be within 100° C. of the glass transition temperature of a second material, $T_{g2}$ (e.g., $|T_{g1}-T_{g2}|$ should be less than 90° C., less than 80° C., less than 70° C., less than 60° C., less than 50° C., less than 40° C., less than 30° C., less than 20° C., less than 10° C.).

Since there are two mechanisms (i.e., elastic and viscoelastic) to develop permanent stress in drawn fibers due to differences between constituent materials, these mechanisms may be employed to offset one another. For example, materials constituting a fiber may naturally offset the stress caused by thermal expansion mismatch if mismatch in the materials $T_g$'s results in stress of the opposite sign. Conversely, a greater difference in $T_g$ between materials is acceptable if the materials' thermal expansion will reduce the overall permanent stress. One way to assess the combined effect of thermal expansion and glass transition temperature difference is to compare each component materials' temperature-length curve. After finding $T_g$ for each material using the foregoing slope-tangent method, one of the curves is displaced along the ordinate axis such that the curves coincide at the lower $T_g$ temperature value. The difference in y-axis intercepts at room temperature yields the strain, $\epsilon$, expected if the glasses were not conjoined. The expected tensile stress, $\sigma$, for the material showing the greater amount of contraction over the temperature range from $T_g$ to room temperature, can be computed simply from the following equation:

$$\sigma = E \cdot \epsilon,$$

where E is the elastic modulus for that material. Typically, residual stress values less than 100 MPa (e.g., less than 50 MPa, less than 30 MPa), are sufficiently small to indicate that two materials are compatible.

A fourth selection criterion is to match the thermal stability of candidate materials. A measure of the thermal stability is given by the temperature interval $(T_x-T_g)$, where $T_x$ is the temperature at the onset of the crystallization as a material cools slowly enough that each molecule can find its lowest energy state. Accordingly, a crystalline phase is a more energetically favorable state for a material than a glassy phase. However, a material's glassy phase typically has performance and/or manufacturing advantages over the crystalline phase when it comes to fiber waveguide applications. The closer the crystallization temperature is to the glass transition temperature, the more likely the material is to crystallize during drawing, which can be detrimental to the fiber (e.g., by introducing optical inhomogeneities into the fiber, which can increase transmission losses). Usually a thermal stability interval, $(T_x-T_g)$ of at least 80° C. (e.g., at least 100° C.) is sufficient to permit fiberization of a material by drawing fiber from a preform. In preferred embodiments, the thermal stability interval is at least 120° C., such as 150° C., 200° C. or more. $T_x$ can be measured using a thermal analysis instrument, such as a differential thermal analyzer (DTA) or a differential scanning calorimeter (DSC).

A further consideration when selecting materials that can be co-drawn are the materials' melting temperatures, $T_m$. At the melting temperature, the viscosity of the material becomes too low to successfully maintain precise geometries during the fiber draw process. Accordingly, in preferred embodiments the melting temperature of one material is higher than the working temperature of a second, Theologically compatible material. In other words, when heating a preform, the preform reaches a temperature at it can be successfully drawn before either material in the preform melts.

One example of a pair of materials which can be co-drawn and which provide a photonic crystal fiber waveguide with high index contrast between layers of the confinement region are $As_2Se_3$ and the polymer PES. $As_2Se_3$ has a glass transition temperature $(T_g)$ of about 180° C. and a thermal expansion coefficient (TEC) of about $24 \times 10^{-6}/°$ C. At 10.6 µm, $As_2Se_3$ has a refractive index of 2.7775, as measured by Hartouni and coworkers and described in Proc. SPIE, 505, 11 (1984), and an absorption coefficient, $\alpha$, of 5.8 dB/m, as measured by Voigt and Linke and described in "Physics and Applications of Non-Crystalline Semiconductors in Optoelectronics," Ed. A. Andriesh and M. Bertolotti, NATO ASI Series, 3. High Technology, Vol. 36, p. 155 (1996). Both of these references are hereby incorporated by reference in their entirety. PES has a TEC of about $55 \times 10^{-6}/°$ C. and has a refractive index of about 1.65.

In some embodiments, photonic crystal fiber waveguides, such as waveguide 100, can be made by rolling a planar multilayer article into a spiral structure and drawing a fiber from a preform derived from the spiral structure.

Figure 2A:
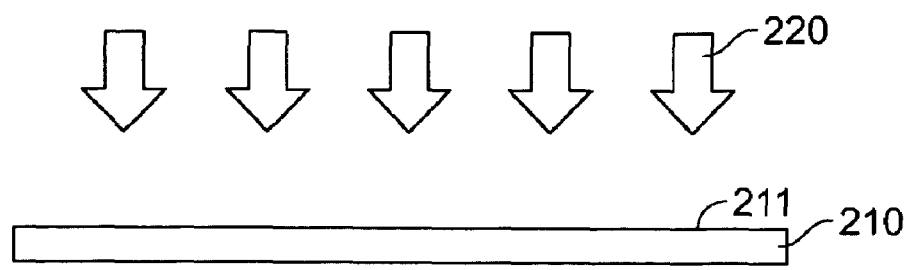
FIG. 2A-2D are schematic diagrams showing steps in a method for making a photonic crystal fiber waveguide
Figure 2B:
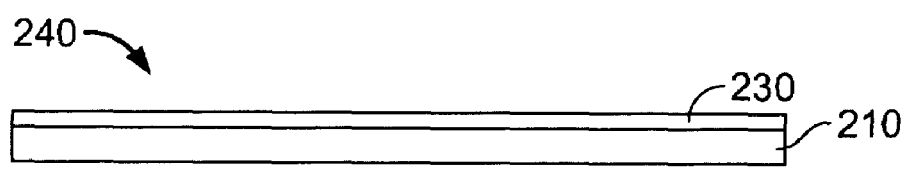

Referring to FIG. 2A, to prepare a preform, a glass is deposited 220 on a surface 211 of a polymer film 210. The glass can be deposited by methods including thermal evaporation, chemical vapor deposition, or sputtering. Referring to FIG. 2B, the deposition process provides a multilayer article 240 composed of a layer 230 of glass on polymer film 210.

Figure 2C:
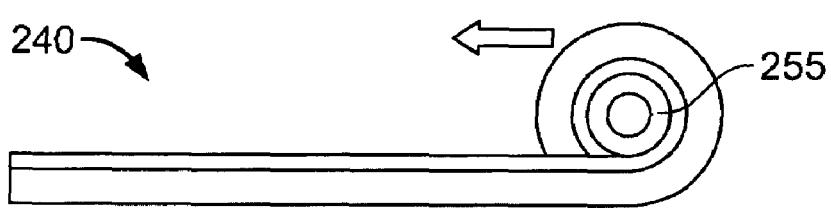
Figure 2D:
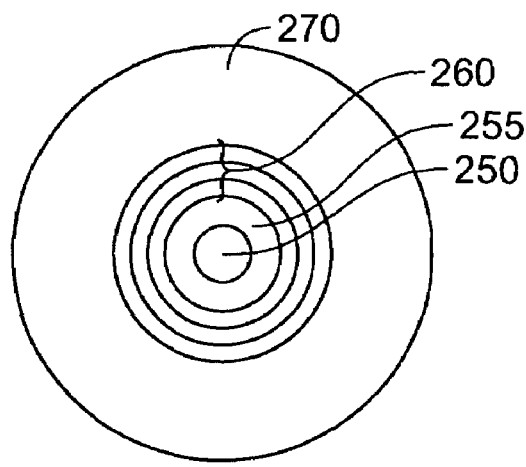

Referring to FIG. 2C, following the deposition step, multilayer film 240 is rolled around a mandrel 255 (e.g., a hollow glass, such as a borosilicate glass, or polymer tube) to form a spiral tube. A number (e.g., about three to ten) of polymer films are then wrapped around the spiral tube to form a preform wrap. In some embodiments, the polymer films are made from the same polymer or glass used to form multilayer article. Under vacuum, the preform wrap is heated to a temperature above the glass transition temperature of the polymer(s) and glass(es) forming multilayer film 240 and the films wrapped around the spiral tube. The preform wrap is heated for sufficient time for the layers of the spiral tube to fuse to each other and for the spiral tube to fuse to polymer films wrapped around it. The temperature and length of time of heating depends on the preform wrap composition. Where the multilayer is composed of $As_2Se_3$ and PES and the wrapping films are composed of PES, for example, heating for 15-20 minutes (e.g., about 18 minutes) at 200-300° C. (e.g., about 250° C.) is typically sufficient. The heating fuses the various layers to each other, consolidating the spiral tube and wrapping films. The consolidated structure is shown in FIG. 2D. The spiral tube consolidates to a multilayer region 260 corresponding to rolled multilayer film 240. The wrapped polymer films consolidate to a monolithic support cladding 270. The consolidated structure retains a hollow core 250 of mandrel 255.

As an alternative to wrapping polymer films around the spiral tube to provide support cladding 270, the spiral tube can be inserted into a hollow tube with inner diameter matching the outer diameter of the spiral tube.

Mandrel 255 is removed from the consolidated structure to provide a hollow preform that is then drawn into a fiber. The preform has the same composition and relative dimensions (e.g., core radius to thickness of layers in the confinement region) of the final fiber. The absolute dimensions of the fiber depend on the draw ratio used. Long lengths of fiber can be drawn (e.g., up to thousands of meters). The drawn fiber can then be cut to the desired length.

Preferably, consolidation occurs at temperatures below the glass transition for the mandrel so that the mandrel provides a rigid support for the spiral tube. This ensures that the multilayer film does not collapse on itself under the vacuum. The mandrel's composition can be selected so that it releases from the innermost layer of the multilayer tube after consolidation. Alternatively, where the mandrel adheres to the innermost layer of the multilayer tube during consolidation, it can be removed chemically, e.g., by etching. For example, in embodiments where the mandrel is a glass capillary tube, it can be etched, e.g., using hydrofluoric acid, to yield the preform.

In embodiments where a solid core is desired, the multilayer tube can be consolidated around a solid mandrel that is co-drawn with the other parts of the fiber. Alternatively, in other embodiments, the multilayer film can be rolled without a mandrel to provide a self-supporting spiral tube.

In some embodiments, glass can be coated on both sides of polymer film 210. This can be advantageous because the each glass layer only needs to be half as thick as a glass layer deposited on one side only. Thinner glass layers are typically less susceptible to mechanical stress damage that can occur during rolling.

Photonic crystal fiber waveguides prepared using the previously discussed technique can be made with a low defect density. For example, waveguides can have less than about one defect per 10 meters of fiber (e.g., less than about one defect per 20 meters, 50 meters, 100 meters of fiber). Defects include both material defects (e.g., impurities) and structural defects (e.g., delamination between layers, cracks with layers), both of which can scatter guided radiation from the core resulting in signal loss and can cause local heating of the fiber. Accordingly, reducing fiber defects is desirable in applications sensitive to signal loss (e.g., in high power applications where radiation absorbed by the fiber can cause damage to the fiber).

Figure 3A:
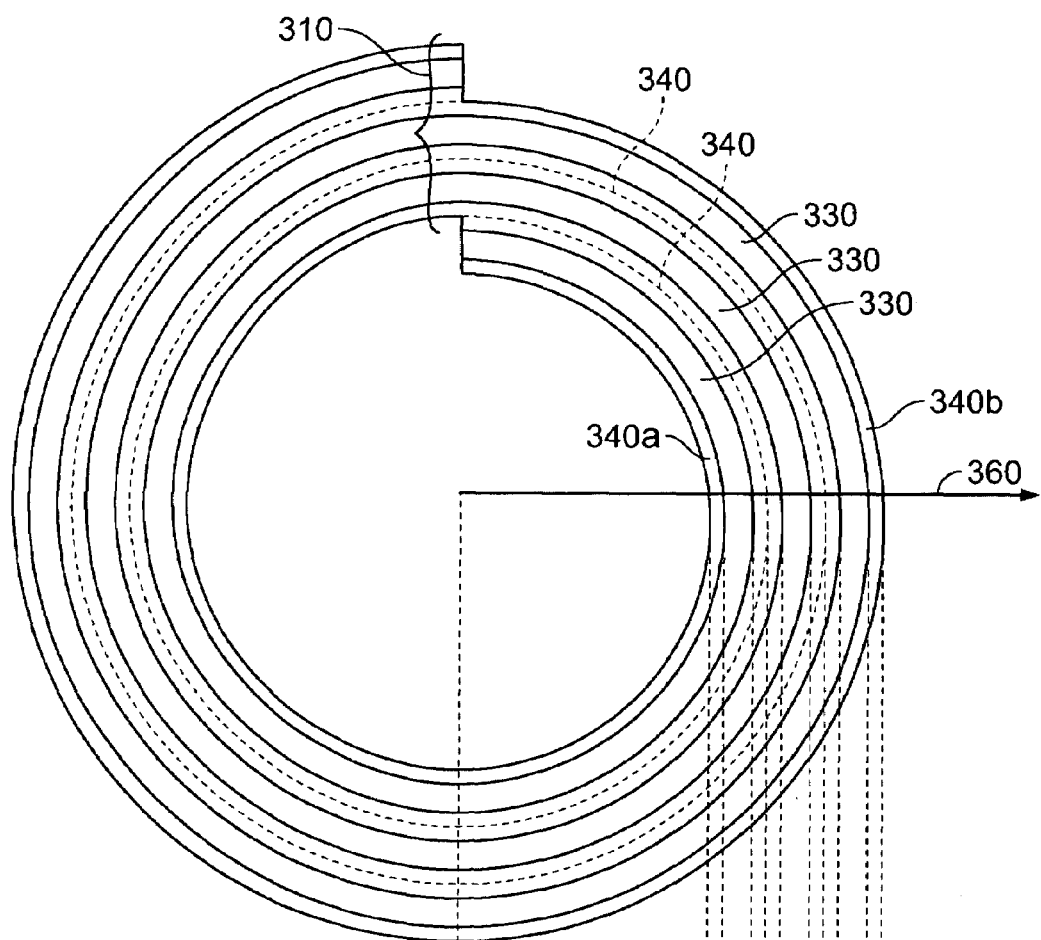
FIG. 3A is a cross-sectional view of a confinement region of an embodiment of a photonic crystal fiber waveguide.
Figure 3B:
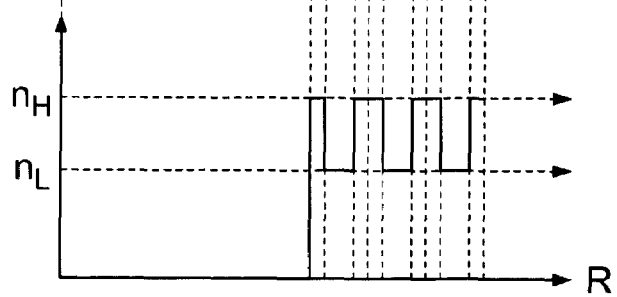
FIG. 3B is a plot of the refractive index profile of the confinement region shown in FIG. 3A.

Photonic crystal fiber waveguides formed from glass films coated on both sides of a substrate provide slightly different index profile than those formed with a single coated side. Referring to FIGS. 3A and 3B, for example, a confinement region 310 of a fiber formed from a multilayer film coated on both sides has a continuous spiral polymer layer 330 and glass layer 340. The innermost 340A and outermost 340B regions of glass layer 340 correspond to a single glass layer coated on the polymer, compared to the double layer thickness that occurs for the other regions. The resulting index profile, taken through a radial section 360, is illustrated in FIG. 3B.

In some embodiments, two or more multilayer films can be prepared and stacked before rolling. In this way, the number of layers in the confinement region can be increased without increasing the size of the film.

As discussed previously, photonic crystal fiber waveguides can be used to guide IR radiation. IR radiation has a wavelength between about 0.7 microns and 20 microns (e.g., between about 2 to 5 microns or between about 8 to 12 microns). In some embodiments, photonic crystal fiber waveguides can be used to guide radiation from IR lasers, such as from a $CO_2$ laser that emits radiation having a wavelength of about 6.5 microns or 10.6 microns. Other examples of lasers which can emit IR energy include Nd:YAG lasers (e.g., at 1.064 microns) Er:YAG lasers (e.g., at 2.94 microns), Er, Cr: YSGG (Erbium, Chromium doped Yttrium Scandium Gallium Garnet) lasers (e.g., at 2.796 microns), Ho:YAG lasers (e.g., at 2.1 microns), free electron lasers (e.g., in the 6 to 7 micron range), and quantum cascade lasers (e.g., in the 3 to 5 micron range).

In some embodiments, photonic crystal fiber waveguides can be used to guide radiation with extremely high power densities. For example, waveguides can be used to guide radiation having power densities more than about 100 $W/cm^2$ (e.g., more than about 300 $W/cm^2$, 500 $W/cm^2$, 1 $kW/cm^2$, such as about 10 $kW/cm^2$ or more). Hollow core waveguides, in particular, are well suited to such applications due to low absorption of guided radiation in the core. Absorption losses can be further mitigated by selecting materials for the waveguide's confine region with low absorption at the guided wavelengths. As discussed previously, chalcogenide glasses, for example, have low absorption at IR wavelengths and are well suited for high power IR waveguides. Radiation losses, which not only degrade waveguide performance but can also damage the waveguide, can also be reduced by selecting materials with high index contrast for the confinement region.

High power densities can be generated in fiber waveguides by coupling radiation from high power lasers into the fiber. For example, radiation from high power IR lasers, such as those listed above, can be guided using photonic crystal fiber waveguides. Laser output power can be more than about one Watt (e.g., about five Watts, 10 Watts, 25 Watts or more). In some applications, the laser output energy can be more than about 100 Watts, such as several hundred Watts (e.g., more than about 200 Watts, 300 Watts, 500 Watts, 1 kilowatt).

In some embodiments, photonic crystal fiber waveguides can have relatively low transmission losses. For example, transmission losses can be less than about 2 dB/m (e.g., less than about 1 dB/m, 0.5 dB/m, such as 0.2 dB/m or less). The fiber waveguides can have low transmission loss at IR wavelengths, such as for certain wavelengths from about 3-5 microns (e.g., about 3.5 microns) or from about 10-12 microns (e.g., about 10.6 microns). Transmission loss can be substantially lower (e.g., 1-3 or more orders of magnitude smaller) than TIR optical fibers made from similar materials. For example, a photonic crystal fiber waveguide having a hollow core and chalcogenide glass/polymer confinement region can have a substantially lower transmission loss than a TIR fiber with a chalcogenide glass core and a polymer cladding. $As_2Se_3$, for example, reportedly has losses of about 7-10 dB/m at 10.6 microns, while PES has losses of approximately 100,000 dB/m at 10.6 microns. In contrast, a photonic crystal fiber waveguide with an $As_2Se_3$/PES confinement region can have losses less than about 1 dB/m. It is believed that the comparatively low losses are made possible by the short penetration depths of guided electromagnetic waves into the confinement region of the fiber. Therefore, even though the materials in the confinement region may have relatively high absorption at the guided wavelengths, the interaction between the guided radiation and the material is minimal.

Photonic crystal fiber waveguides can also experience relatively low loss due to bends in the fiber. For example, a 90 degree bend in a fiber with a radius of curvature less than about 10 cm (e.g., less than about 5 cm, such as 4 cm or less) can cause losses below about 2 dB (e.g., 1.5 dB, 1 dB, 0.5 dB or less). Having relatively low loss associated with bending is advantageous in many fiber applications where the relative strength of a transmitted signal preferably does not vary substantially as the fiber bends during use.

Low transmission loss (e.g., intrinsic loss and/or loss due to bends) is also typically advantageous in high power applications where power lost along the length of the fiber can damage the fiber in addition to delivering less power from the radiation source to its destination.

EXAMPLES

A variety of fibers were fabricated by depositing a 5-10 micron thick $As_2Se_3$ layer using thermal evaporation onto a 25-50 micron thick PES film and subsequently rolling the coated films around hollow glass mandrels. The tubes were clad with a thick outer layer of PES and consolidated by heating under vacuum. After consolidation, the mandrels were etched away by introducing hydrofluoric acid into the hollow core of the mandrel. Etching provided layered preforms, each of which was placed in an optical fiber draw tower and drawn into tens to hundreds of meters of fiber.

The nominal position(s) of the photonic band gap(s) of each fiber were determined by monitoring the outer diameter (OD) of the fiber during the draw process. The photonic band gap positions were determined from the draw ratio, provided by the OD measurement. Typical standard deviations of the fiber OD were approximately one percent of the OD.

Figure 4A:
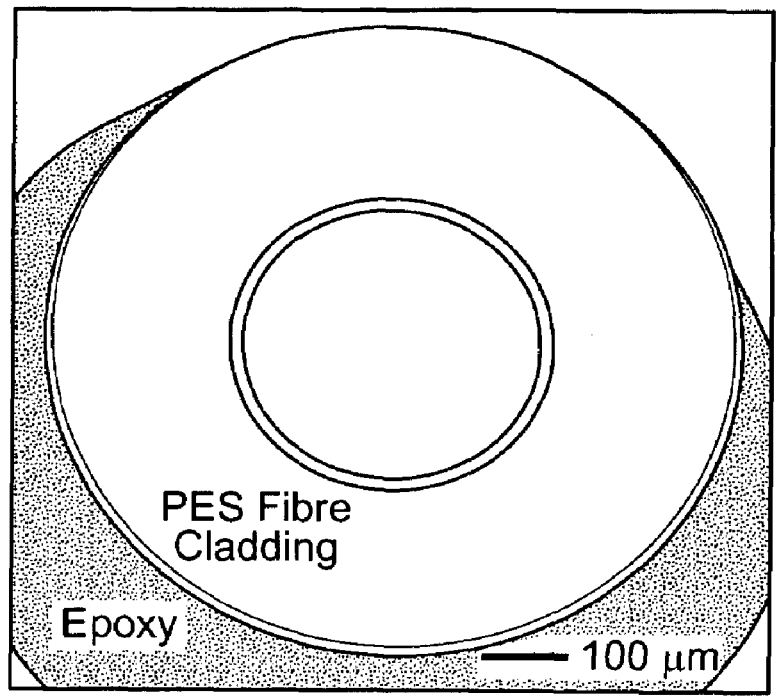
FIGS. 4A and 4B are SEM micrographs of an example of a photonic crystal fiber waveguide.
Figure 4B:
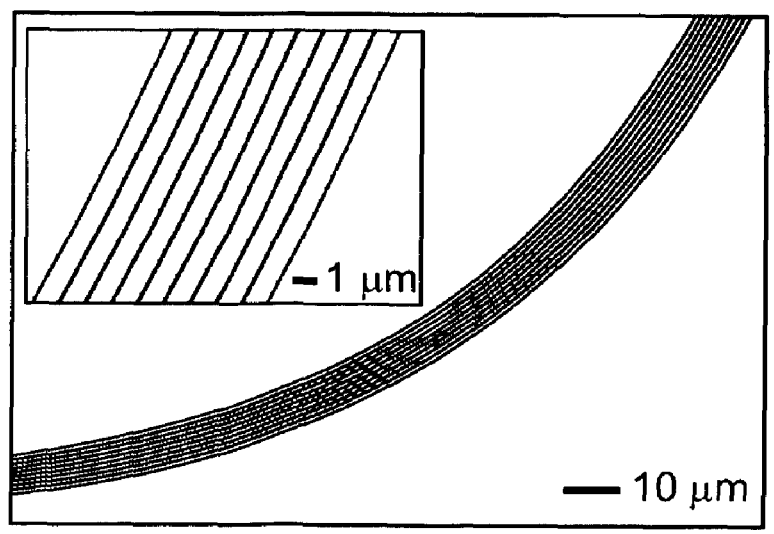

Referring to FIGS. 4A and 4B, scanning electron microscope (SEM) analysis of one of the fiber's cross section revealed that the drawn fibers generally maintained proportionate layer thickness ratios and that the PES and $As_2Se_3$ films adhered well during the thermal cycling and elongation associated with the fabrication process. Within the multilayer structure shown in FIGS. 4A and 4B, the PES layers (grey) had a thickness of about 900 nm, and the $As_2Se_3$ layers (bright) were about 270 nm thick (except for the first and last $As_2Se_3$ layer, which were 135 nm thick).

Figure 5:
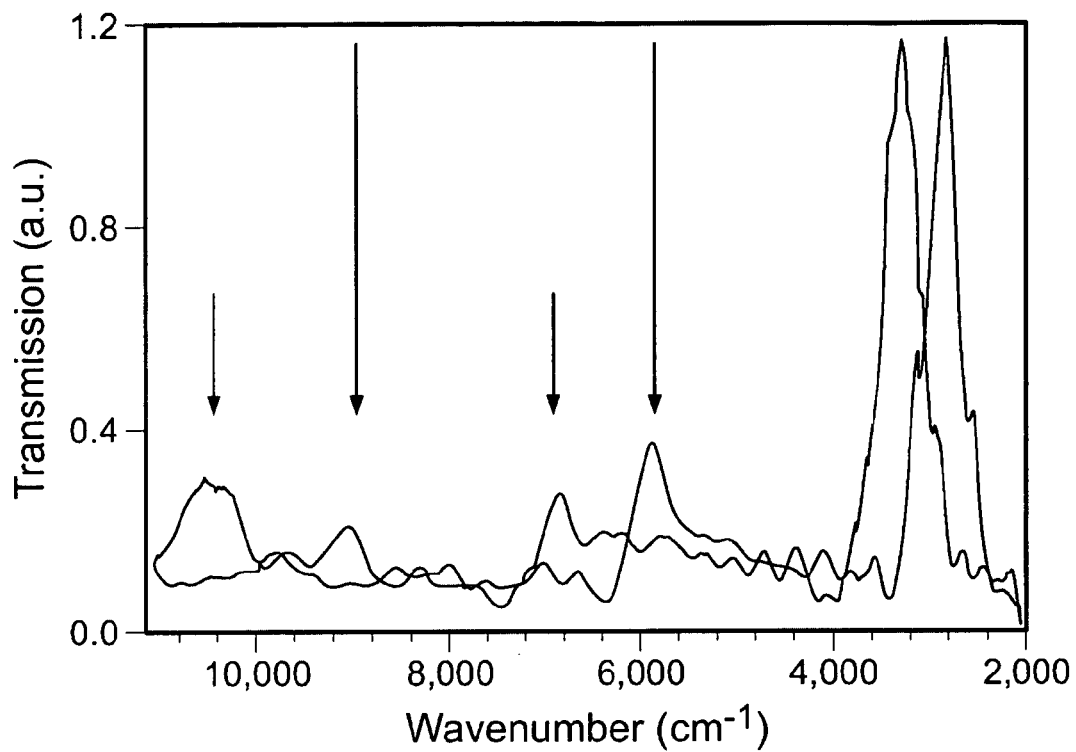
FIG. 5 are plots of transmission spectra for two different examples of photonic crystal fiber waveguides. The tallest transmission peak corresponds to the primary photonic band gap in each case, while the arrows indicate higher order band gaps.

Broadband fiber transmission spectra were measured with a Fourier transform infrared (FTIR) spectrometer (Nicolet Magna 860), using a parabolic mirror to couple light into the fiber and an external detector. The results of these measurements are shown in FIG. 5 for fibers having two different layer structures. For each spectrum, light was guided at the fundamental and high-order photonic band gaps.

Figure 6A:
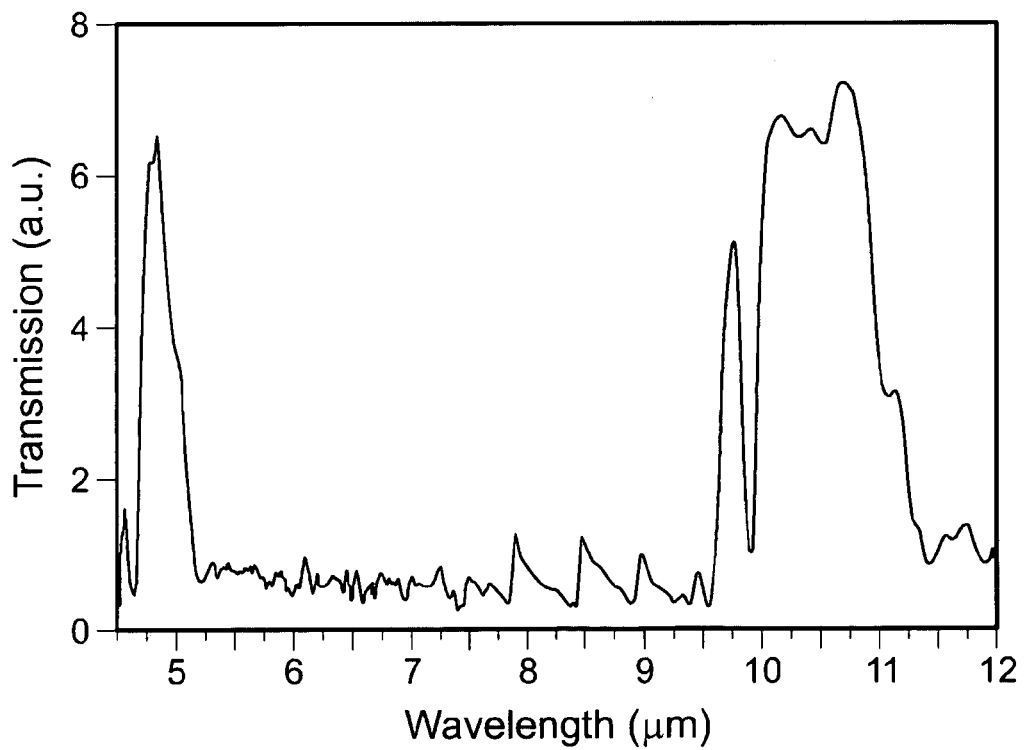
FIG. 6A is a plot of the transmission spectrum of an example of a photonic crystal fiber waveguide.

Some fibers were prepared having hollow core diameters of 700-750 microns and ODs of 1300-1400 microns with a fundamental photonic band gap spanning the 10-11 micron wavelength regime. FIG. 6A shows an FTIR transmission spectrum for one of these fibers, measured using an approximately 30 cm long straight section of fiber.

In order to quantify the transmission losses in these fibers, fiber cutback measurements were performed. These measurements involved comparing the intensity of radiation transmitted through about 4 meters of straight fiber with the intensity of transmission through the same section of fiber cut to shorter lengths (see FIG. 6B). This test was performed on multiple sections of fiber, and the results were found to be nearly identical for the different sections tested. The measurements were performed using a 25 Watt $CO_2$ laser (GEM-25, Coherent-DEOS) and high power detectors (818T-10 detectors, obtained from Newport). The fiber was held straight, secured at both ends as well as at multiple points between the fiber ends to reduce variations in the input coupling and propagation conditions during fiber cutting. The laser beam was directed through focusing lenses as well as a 500 micron diameter pinhole aperture prior to entering the fiber. In addition, the input end face of the fiber was coated with a metal film to reduce accidental laser damage from misalignment.

Figure 6B:
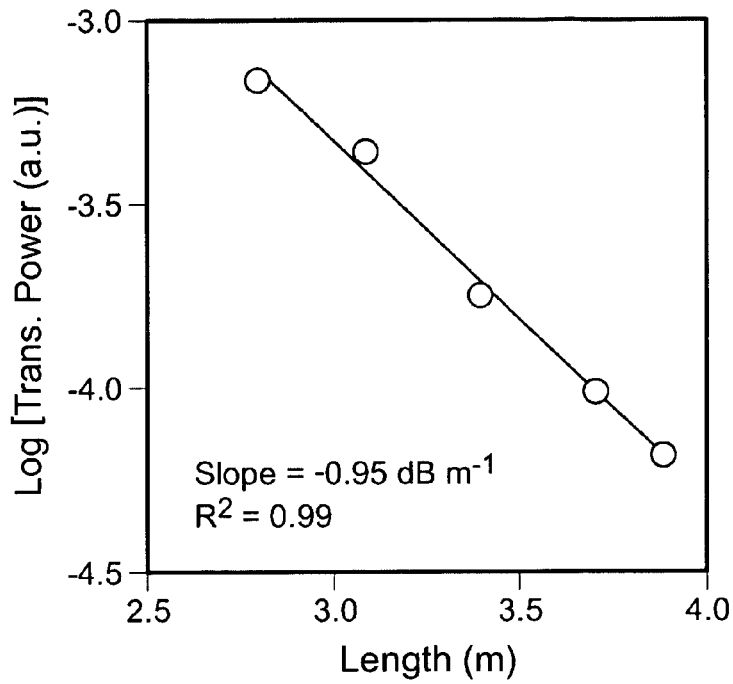
FIG. 6B is a plot of the log of transmitted power as a function of fiber length for an example of a photonic crystal fiber waveguide cut to different lengths. The slope of the plot is in dB/m.

Transmission losses in the fibers' fundamental band gap at about 10.6 microns were measured to be about 0.95 dB/m, as shown in FIG. 6B, with an estimated measurement uncertainty of about 0.15 dB/m. A bending analysis (discussed below) for fibers with a band gap centered at about 10.6 microns revealed bending losses below about 1.5 dB/m for 90 degree bends with bending radii from 4-10 cm.

Figure 7:
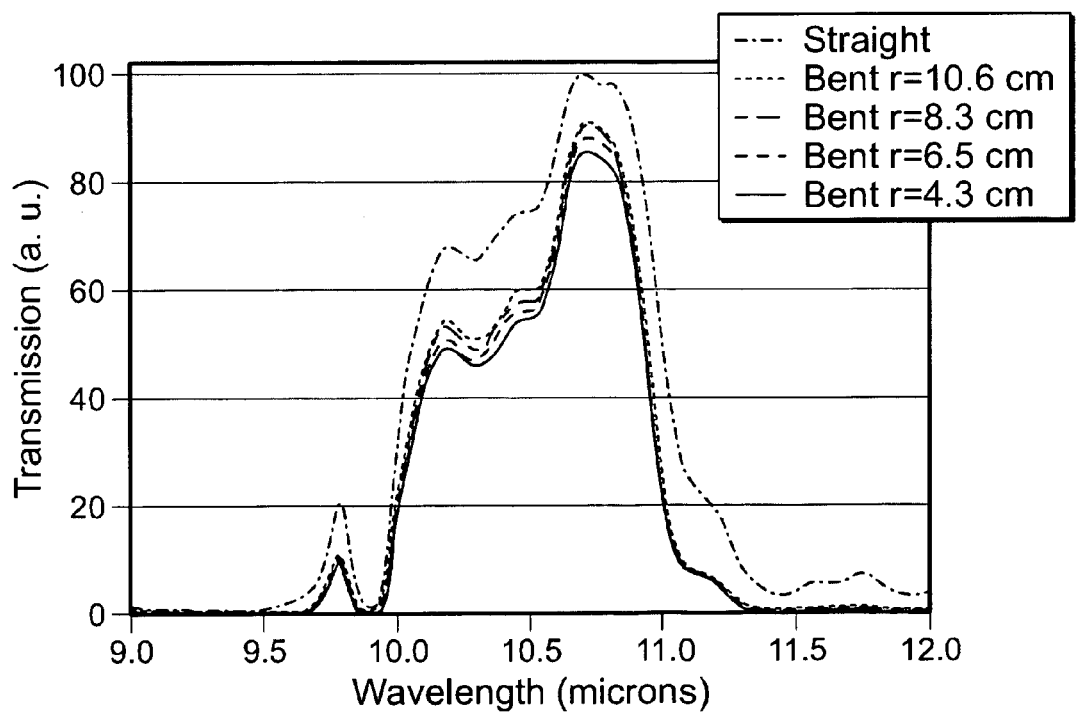
FIG. 7 is a plot showing transmission spectra for a fiber bent with varying radii of curvature.

Bend loss measurements were performed using a broad band FTIR source and a $CO_2$ laser operating at 10.6 microns. For each measurement, the fibers were bent at an angle of 90 degrees around metal cylinders of varying radii. The amount of fiber after the bend was about 15 cm in each case. This portion was held straight in each case. FIG. 7 shows the relative intensities as measured using an FTIR spectrometer for a straight fiber approximately 50 cm in length and the same fiber at different bending radii.

Figure 8:
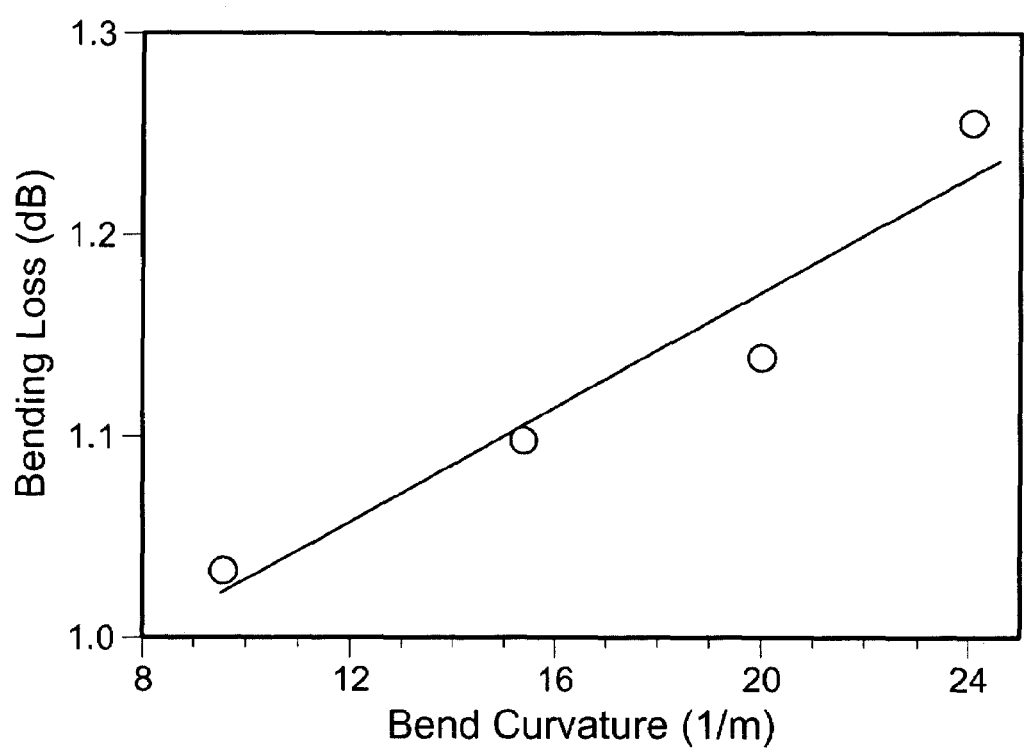
FIG. 8 is a plot of bend loss as a function of bend curvature for transmission of EM radiation from a CO2 laser through an photonic crystal fiber waveguide. Loss values were obtained by comparing the total transmitted power through the bent fiber to the same fiber when held straight.

The FTIR bending measurements shown in FIG. 7 give a total bending loss value below 1 dB for the bend with the largest radius. To corroborate these results, similar tests were performed with $CO_2$ laser measurements using a length of fiber about 2.5 m long. FIG. 8 shows the average bending loss in dB for 90 degree bends for the $CO_2$ laser referenced to the length of fiber without bends.

The $CO_2$ laser bending loss results represented an average of multiple trials, and variability observed in the losses was on the order of about 0.2 dB. The results obtained using the $CO_2$ laser had the same qualitative characteristics as those obtained using the FTIR apparatus. It was noted that the different sources used had different coherency, numerical aperture, and polarization state. It was thus expected that they would couple to modes having different loss characteristics.

The maximum laser power density coupled into the fibers from the $CO_2$ laser was approximately 300 W/m$^2$, which was sufficient to burn holes through paper and PES films (the fiber majority component). No damage to the fibers was observed when the radiation was properly coupled into the hollow fiber core. The $CO_2$ laser (GEM-25, Coherent-DEOS) was aligned using a HeNe laser. The HeNe laser was used to trace the path of the $CO_2$ laser, allowing the apparatus to be aligned with a relatively low power laser. A ZnSe beamsplitter was placed between the laser and the fiber to split off a reference beam. The beam transmitted by the beamsplitter was focused through a pinhole aperture using a lens assembly prior to coupling into the fiber. Data was collected simultaneously from the beamsplitter reference beam and the fiber output using a Newport dual-channel power meter with a GPIB/Labview computer interface.

In the cutback measurements, the fiber was cut using a swift razor-cutting action, which produced reasonably reproducible cuts. In order to account for any residual variability in cutting, any short cuts (e.g., 1-2 mm) were performed around each data point recorded in the cutback measurement data shown in FIG. 6B. Power levels did not vary greatly due to the cuts, although data from obviously poor cuts was discarded. The data measured for each cut at a cut length was averaged to provide the data shown in FIG. 6B. In addition, the power ratio between the transmitted and reference beams measured after each cut was time-averaged over several minutes.

Variable modal output patterns were also observed in fibers by varying the input coupling conditions of the $CO_2$ laser in approximately 4 meters long fibers with core diameters of about 700 microns that were held nominally straight. The modal output patterns were observed by imaging the output beam using a Spiricon Pyrocam III. Imaging different modal patterns suggested that the fiber operates in a relatively few-mode regime (e.g., the fibers have about 10 or fewer guided modes).

ADDITIONAL EMBODIMENTS

A number of embodiments of the invention have been described. Nevertheless, it will be understood that various modifications may be made without departing from the spirit and scope of the invention. Accordingly, other embodiments are within the scope of the following claims.

What is claimed is:

1. An article comprising:
a fiber waveguide comprising alternating layers of different materials surrounding a core extending along a longitudinal waveguide axis, wherein the alternating layers define a spiral structure in a cross-sectional plane normal to the longitudinal waveguide axis, and wherein the alternating layers define a radial variation in index of refraction sufficient to guide EM radiation within a first wavelength range along the longitudinal waveguide axis.

2. The article of claim 1, wherein the spiral structure comprises a multilayer structure comprising at least two layers of the different materials encircling the core multiple times.

3. The article of the claim 1, wherein the different materials comprise a high-index dielecric material and a low-index dielectric material, and wherein a ratio of the refractive index of the high-index material to that of the low-index material is greater than 1.5.

4. The article of claim 3, wherein the ratio is greater than 1.8.

5. The article of claim 1, wherein the different materials comprise a polymer and a chalcogenide glass.

6. The article of claim 5, wherein the polymer comprises PES and the chalcogenide glass comprises $As_2Se_3$.

7. The article of claim 1, wherein the inner most layer of the alternating layers has a thickness smaller than that of subsequent layers of the same material.

8. The article of claim 1, wherein thicknesses of the alternating layers are selected to guide EM radiation along the waveguide axis at a wavelength of about 10.6 microns.

9. The article of claim 1, wherein thicknesses of the alternating layers are selected to guide EM radiation along the waveguide axis at a wavelength in the range of about 8-12 microns.

10. The article of claim 1, wherein thicknesses of the alternating layers are selected to guide EM radiation along the waveguide axis at a wavelength in the range of about 2-5 microns.

11. The article of claim 1, wherein the core is hollow.

12. The article of claim 1, wherein the fiber waveguide exhibits transmission losses smaller than about 1 dB/m at a selected wavelength for a straight length of the fiber.

13. The article of claim 12, wherein the selected wavelength is in a range of about 0.75 to about 10.6 microns.

14. The article of claim 13, wherein the selected wavelength is about 10.6 microns.

15. The article of claim 1, wherein the fiber waveguide exhibits transmission losses smaller than about 1.5 dB at a selected wavelength when bent around a 90 degree turn with any bending radius within a range of about 4-10 cm.

16. The article of claim 15, wherein the selected wavelength is in a range of about 0.75 to about 10.6 microns.

17. The article of claim 1, wherein the fiber waveguide is capable of guiding EM radiation along the waveguide axis at power densities greater than or equal to about 300 W/cm$^2$ selected wavelength.

18. The article of claim 17, wherein the selected wavelength is in a range of about 0.75 to about 10.6 microns.

19. The article of claim 18, wherein the selected wavelength is about 10.6 microns.

20. The article of claim 17, wherein the fiber waveguide is capable of guiding the EM radiation along the waveguide axis at power densities greater than or equal to about 300 W/cm$^2$ for the selected wavelength even when the fiber waveguide is smoothly bent around a 90 degree turn with a bent length of at least 0.3 m.

21. The article of claim 1, wherein the fiber waveguide is capable of guiding the EM radiation along the waveguide axis at powers greater than or equal to about 25 W for a selected wavelength.

22. The article cf claim 21, wherein the selected wavelength is in a range of about 0.75 to about 10.6 microns.

23. The article of claim 22, wherein the selected wavelength is about 10.6 microns.

24. The article of claim 1, wherein the fiber waveguide is a photonic crystal fiber waveguide.

25. The article of claim 1, wherein the refractive index for at least one of the alternating layers is larger than that for the core.

26. The article of claim 1, wherein the refractive index for each of the alternating layers is larger than that for the core.

27. An article comprising:
a fiber waveguide comprising alternating layers of different materials surrounding a core extending along a waveguide axis, wherein the alternating layers define a spiral structure in a cross-sectional plane perpendicular to the waveguide axis,
wherein the different materials a comprise a high-index dielectric material and a low-index dielectric material, and wherein a ratio of refractive index of the high-index material to that of the low-index material is greater than 1.5.

28. An article comprising:
a fiber waveguide comprising alternating layers of different materials surrounding a core extending along a waveguide axis, wherein the alternating layers define a spiral structure in a cross-sectional plane perpendicular to the waveguide axis,
wherein the different materials comprise a polymer and a chalcogenide glass.

29. An article comprising:
a fiber waveguide comprising alternating layers of different materials surrounding a core extending along a waveguide axis, wherein the alternating layers define a spiral structure in a cross-sectional plane perpendicular to the waveguide axis,
wherein the inner most layer of the alternating layers has a thickness smaller than that of subsequent layers of the same material.

30. An article comprising:
a fiber waveguide comprising alternating layers of different materials surrounding a core extending along a longitudinal waveguide axis, wherein the alternating layers define a spiral structure in a cross-sectional plane perpendicular to the waveguide axis,
wherein the core is hollow, and
wherein the alternating layers define a radial variation in index of refraction sufficient to guide EM radiation within a first wavelength range along the longitudinal waveguide axis.

31. An article comprising:
a fiber waveguide comprising alternating layers of different materials surrounding a core extending along a waveguide axis, wherein the alternating layers define a spiral structure in a cross-sectional plane perpendicular to the waveguide axis,
wherein the fiber waveguide is a photonic crystal fiber waveguide.

32. An article comprising:
a fiber waveguide comprising alternating layers of different materials surrounding a core extending along a waveguide axis, wherein the alternating layers define a spiral structure in a cross-sectional plaint perpendicular to the waveguide axis,
wherein the refractive index for a least one of the alternating layers is larger than that for the core.

* * * * *

UNITED STATES PATENT AND TRADEMARK OFFICE
CERTIFICATE OF CORRECTION

PATENT NO. : 7,272,285 B2
APPLICATION NO. : 10/733873
DATED : September 18, 2007
INVENTOR(S) : Gilles Benoit et al.

It is certified that error appears in the above-identified patent and that said Letters Patent is hereby corrected as shown below:

Cover Page
(75) Inventors:, replace "Shandon Hart, Cambridge, MA (US)" with
--Shandon Hart, Trumansburg, NY (US)--
(73) Assignee, replace "institute" with --Institute--

Page 3
Second Column, Yeh et al. (second occurrence) replace "687" with --67--
Second Column, European Search Report, second line, insert
--from Examiner W. Elflein-- before the words "dated May 12, 2006"

Column 2
Line 5, replace "Theologically" with --rheologically--

Column 6
Line 11, replace "an" with --a--
Line 46, replace "an" with --a--

Column 7
Line 10, replace "Theologically" with --rheologically--

Column 11
Line 32, delete "a" after "embedding"

Column 12
Line 9, delete "a" before "robust"
Line 16 and 17, replace "Theologically" with --rheologically--
Line 23, replace "Theologically" with --rheologically--
Line 23, delete "usefule" and insert --useful to-- before "define"

Column 13
Line 9, replace "$\eta_{a2}$" with --$T_{a2}$--
Line 13, replace "Theologically" with --rheologically--
Line 66, insert --it-- after "when"

UNITED STATES PATENT AND TRADEMARK OFFICE
CERTIFICATE OF CORRECTION

PATENT NO. : 7,272,285 B2
APPLICATION NO. : 10/733873
DATED : September 18, 2007
INVENTOR(S) : Gilles Benoit et al.

It is certified that error appears in the above-identified patent and that said Letters Patent is hereby corrected as shown below:

Column 16
Lines 2 and 3, replace "Theologically" with --rheologically--
Line 40, replace "article" with --articles--

Column 17
Line 22, delete "the" after "because"

Column 21
Line 65, claim 17, insert --for a-- before "selected"

Column 22
Line 30, claim 27, delete "a" before "comprise"

Column 24
Line 2, claim 32 cont., replace "plaint" with --plane-- after "cross-sectional"

Signed and Sealed this

Twenty-fourth Day of February, 2009

JOHN DOLL
*Acting Director of the United States Patent and Trademark Office*